(12) United States Patent
Hoffman et al.

(10) Patent No.: US 9,626,248 B2
(45) Date of Patent: Apr. 18, 2017

(54) LIKELIHOOD BASED REBUILDING OF MISSING ENCODED DATA SLICES

(71) Applicant: CLEVERSAFE, INC., Chicago, IL (US)

(72) Inventors: Steven Mark Hoffman, Chicago, IL (US); Jason K. Resch, Chicago, IL (US); S. Christopher Gladwin, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 302 days.

(21) Appl. No.: 14/327,582

(22) Filed: Jul. 10, 2014

(65) Prior Publication Data

US 2014/0325266 A1 Oct. 30, 2014

Related U.S. Application Data

(63) Continuation-in-part of application No. 14/275,560, filed on May 12, 2014, which is a continuation of (Continued)

(51) Int. Cl.
*G06F 11/00* (2006.01)
*G06F 11/10* (2006.01)
(Continued)

(52) U.S. Cl.
CPC ...... *G06F 11/1092* (2013.01); *G06F 11/2094* (2013.01); *G06F 2211/1028* (2013.01); *G11B 5/09* (2013.01)

(58) Field of Classification Search
CPC ............ G06F 11/1076; G06F 11/1662; G06F 2211/1002–2211/1092; G06F 11/1092; G06F 11/2094; G11B 5/09
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Jason Bryan
(74) *Attorney, Agent, or Firm* — Garlick & Markison; Timothy W. Markison

(57) ABSTRACT

A method begins by a processing module of a dispersed storage network (DSN) detecting a likelihood of having a missing encoded data slice based on local physical to DSN address mapping information. When the likelihood of having the missing encoded data slice exists, the method continues with the processing module sending a query regarding the missing encoded data slice to another storage unit of the DSN and receiving a response to the query from the other storage unit. When the response includes identity of a related encoded data slice of a set of encoded data slices, the method continues with the processing module commencing execution of a rebuilding function to generate a new encoded data slice to replace the missing encoded data slice.

10 Claims, 20 Drawing Sheets

Related U.S. Application Data application No. 13/779,452, filed on Feb. 27, 2013, now Pat. No. 8,726,071, which is a continuation of application No. 12/845,590, filed on Jul. 28, 2010, now Pat. No. 8,527,807.

(60) Provisional application No. 61/264,316, filed on Nov. 25, 2009.

(51) Int. Cl.
*G06F 11/20* (2006.01)
*G11B 5/09* (2006.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,353,895 | B1* | 3/2002 | Stephenson ......... G06F 11/1076 711/114 |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0073279 | A1* | 6/2002 | Sasamoto ......... G06F 11/1076 711/114 |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2008/0126849 | A1* | 5/2008 | Kotzur ................ G06F 11/2094 714/6.32 |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Confer-

(56) References Cited

OTHER PUBLICATIONS ence on Architectural Support for Programming Languages and Operating Systems (ASPLOS 2000); Nov. 2000; pp. 1-12.

* cited by examiner computing system 10

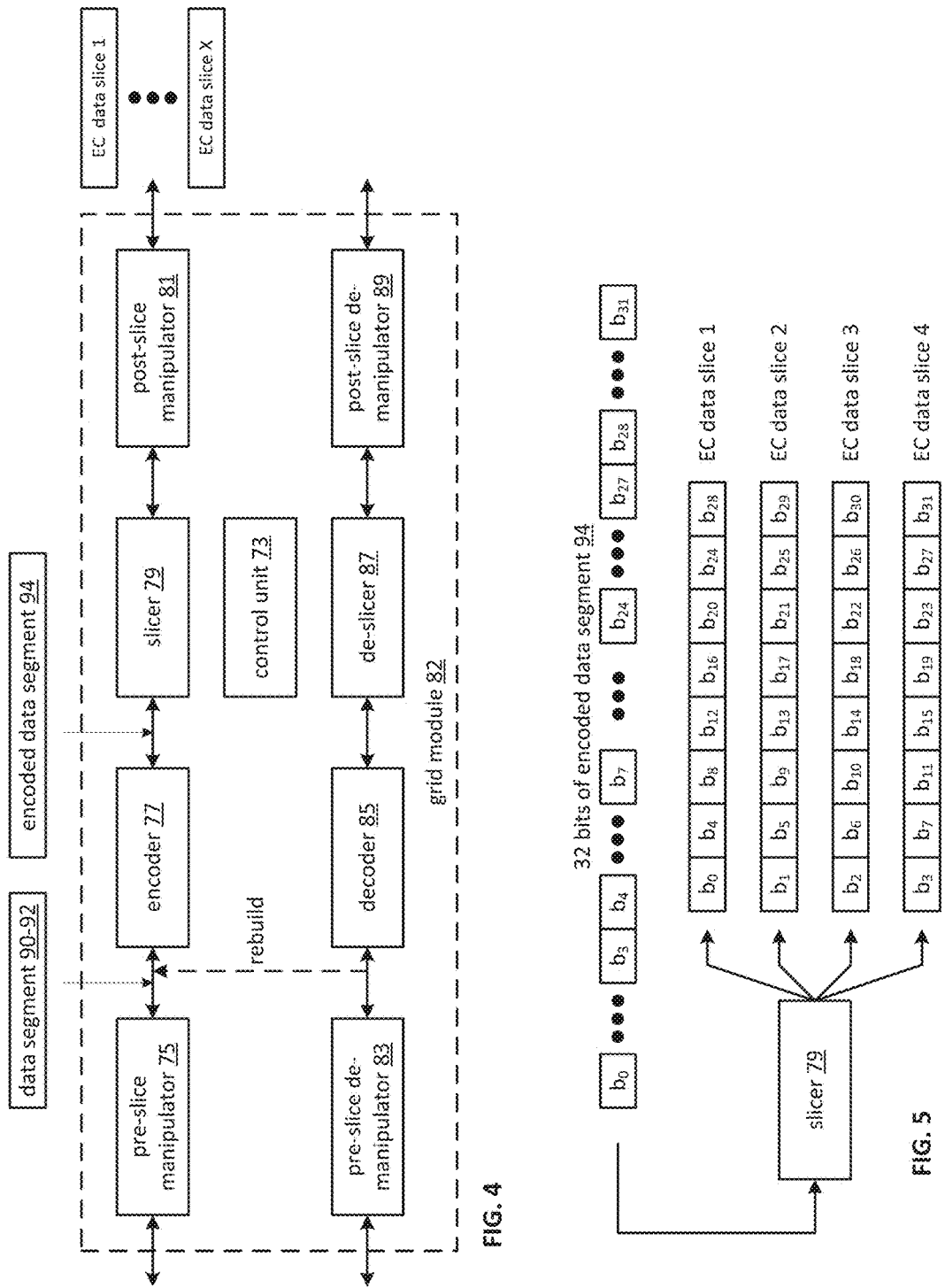

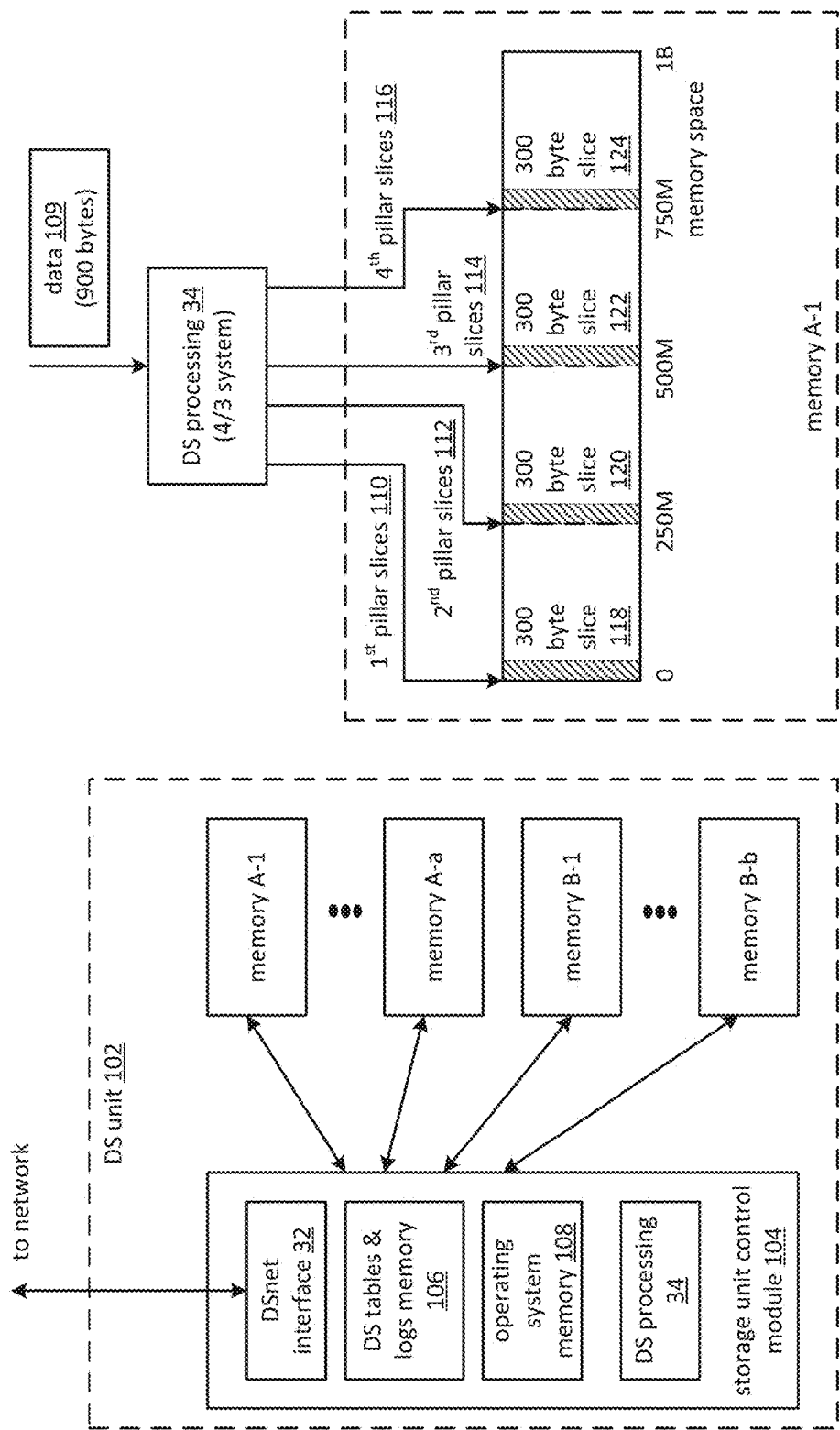

US 9,626,248 B2

LIKELIHOOD BASED REBUILDING OF MISSING ENCODED DATA SLICES

CROSS REFERENCE TO RELATED PATENTS

The present U.S. Utility patent application claims priority pursuant to 35 U.S.C. §120 as a continuation-in-part of U.S. Utility application Ser. No. 14/275,560, entitled "LOCALIZED DISPERSED STORAGE MEMORY SYSTEM", filed May 12, 2014, which is a continuation of U.S. Utility application Ser. No. 13/779,452, entitled "LOCALIZED DISPERSED STORAGE MEMORY SYSTEM", filed Feb. 27, 2013, now U.S. Pat. No. 8,726,071, issued on May 13, 2014, which is a continuation of U.S. Utility application Ser. No. 12/845,590, entitled "LOCALIZED DISPERSED STORAGE MEMORY SYSTEM", filed Jul. 28, 2010, now U.S. Pat. No. 8,527,807, issued on Sep. 3, 2013, all of which are hereby incorporated herein by reference in their entirety and made part of the present U.S. Utility patent application for all purposes.

U.S. Utility application Ser. No. 12/845,590 claims priority pursuant to 35 USC §119(e) to U.S. Provisional Application No. 61/264,316, entitled "DISTRIBUTED STORAGE NETWORK MEMORY SYSTEM", filed Nov. 25, 2009.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the present invention;

FIG. 5 is a diagram of an example embodiment of error coded data slice creation in accordance with the present invention;

FIG. 6 is a schematic block diagram of an embodiment of a dispersed storage unit in accordance with the present invention;

FIG. 7 is a schematic block diagram of another embodiment of a dispersed storage unit in accordance with the present invention;

Figure 11A:
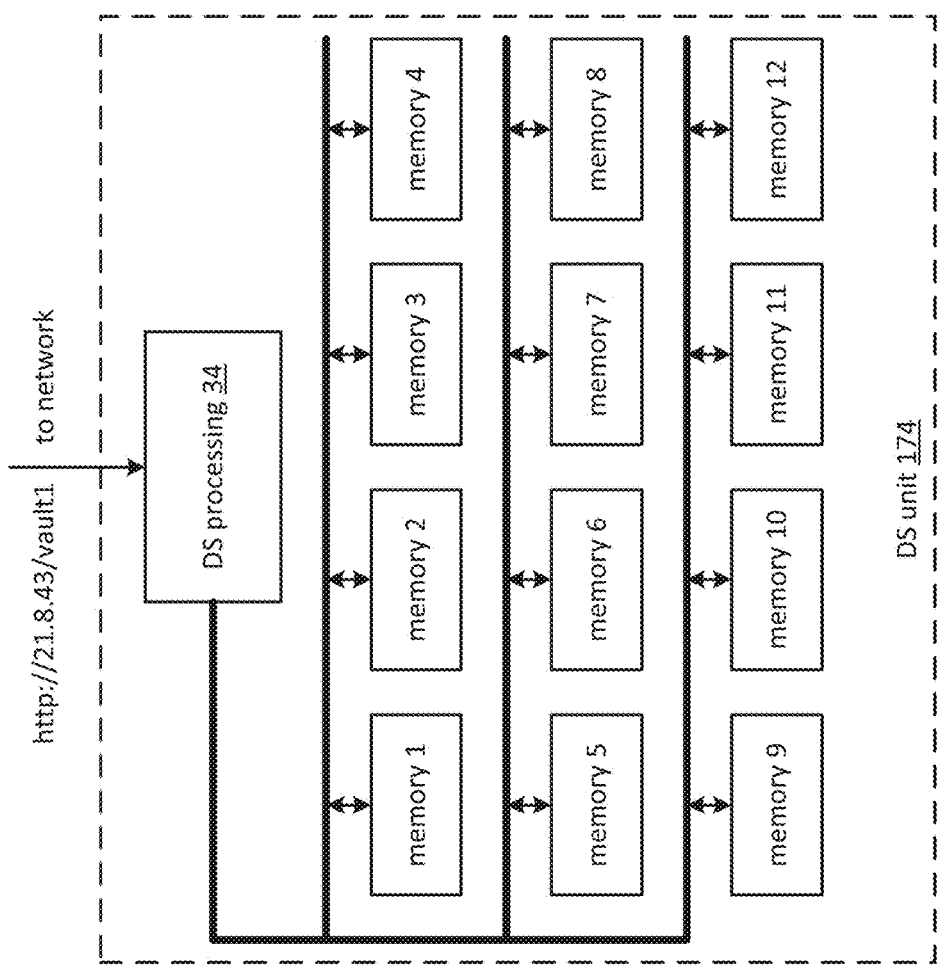
FIG. 11A is a schematic block diagram of another embodiment of a dispersed storage unit in accordance with the present invention.
Figure 11B:
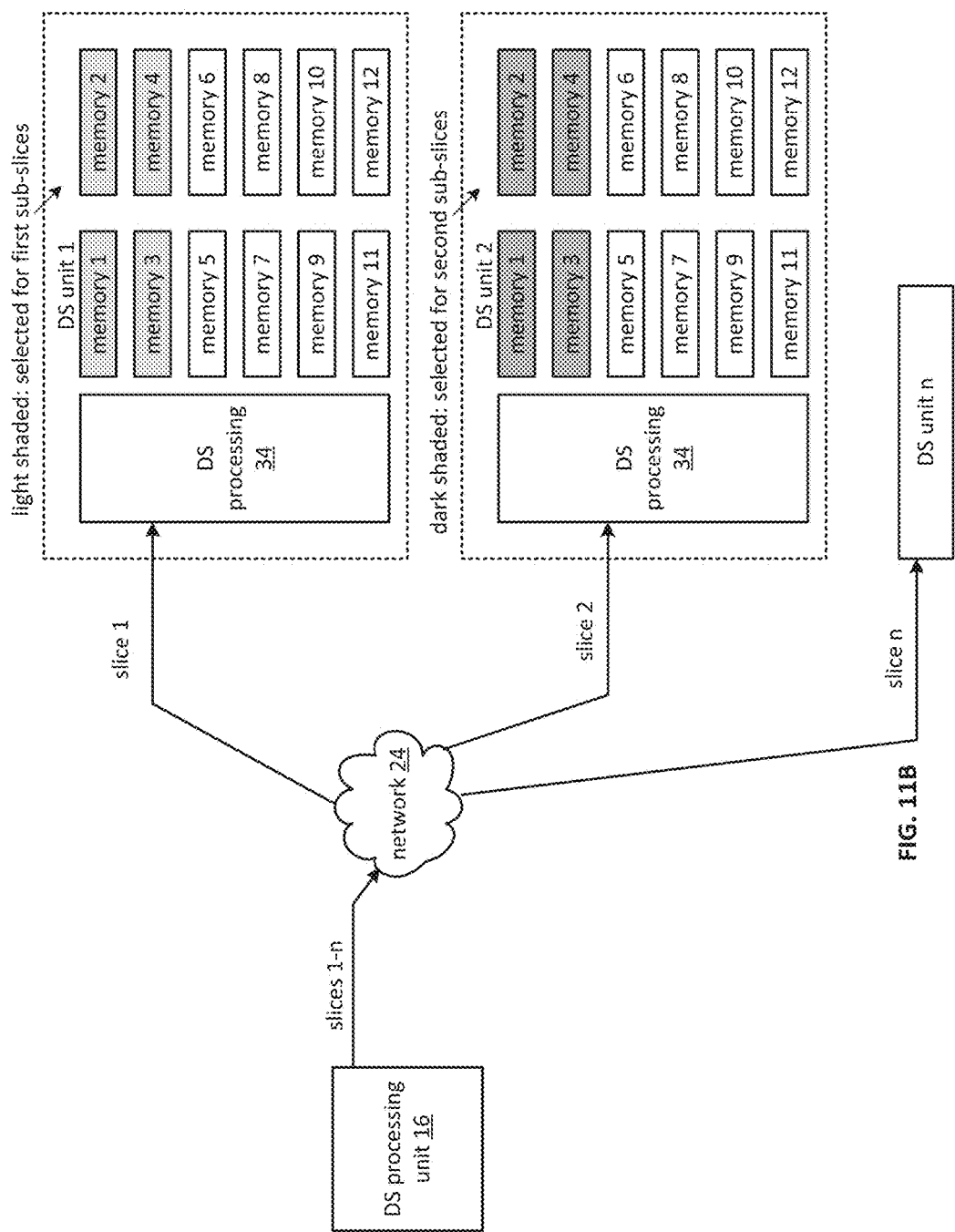
Figure 11C:
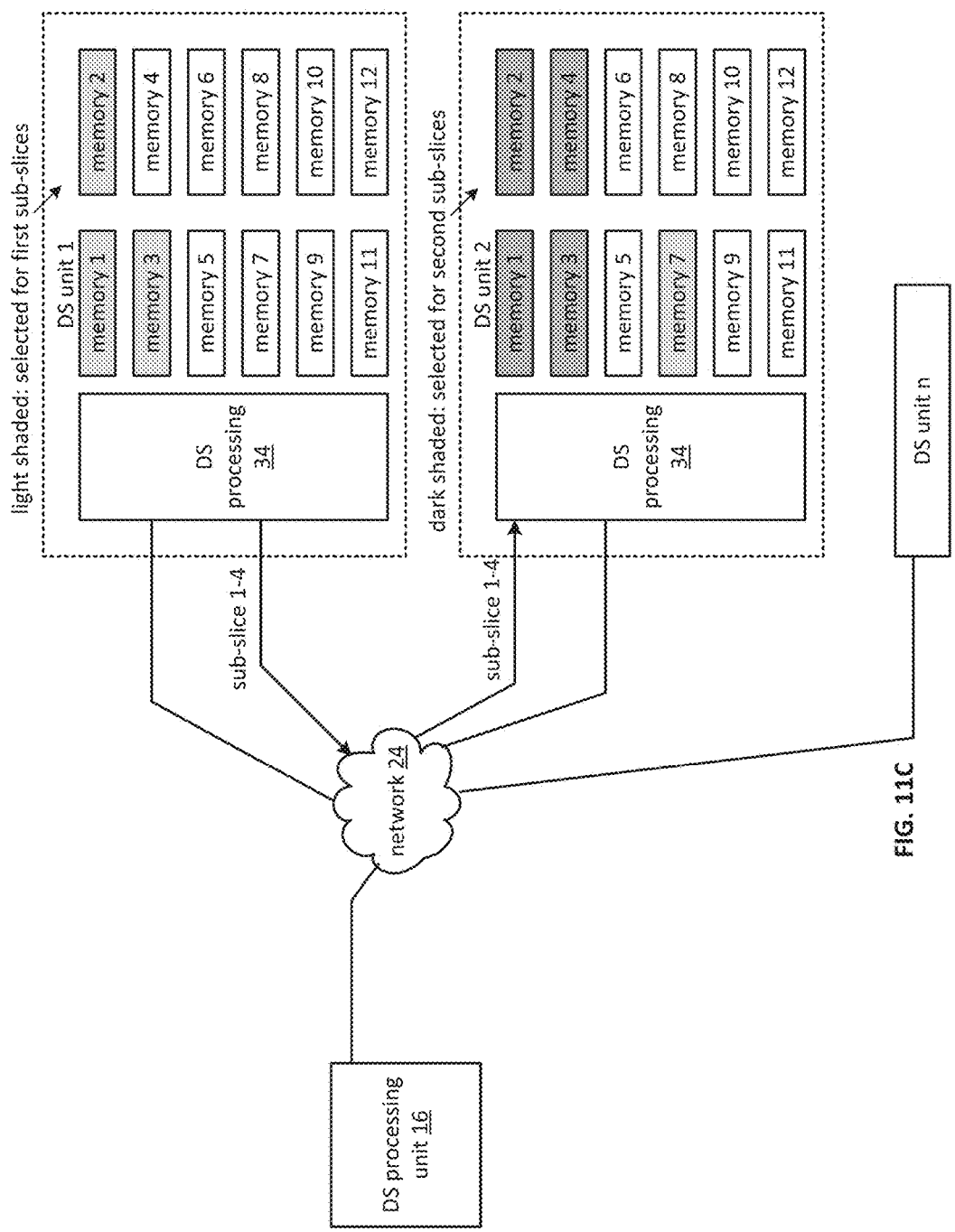
Figure 11D:
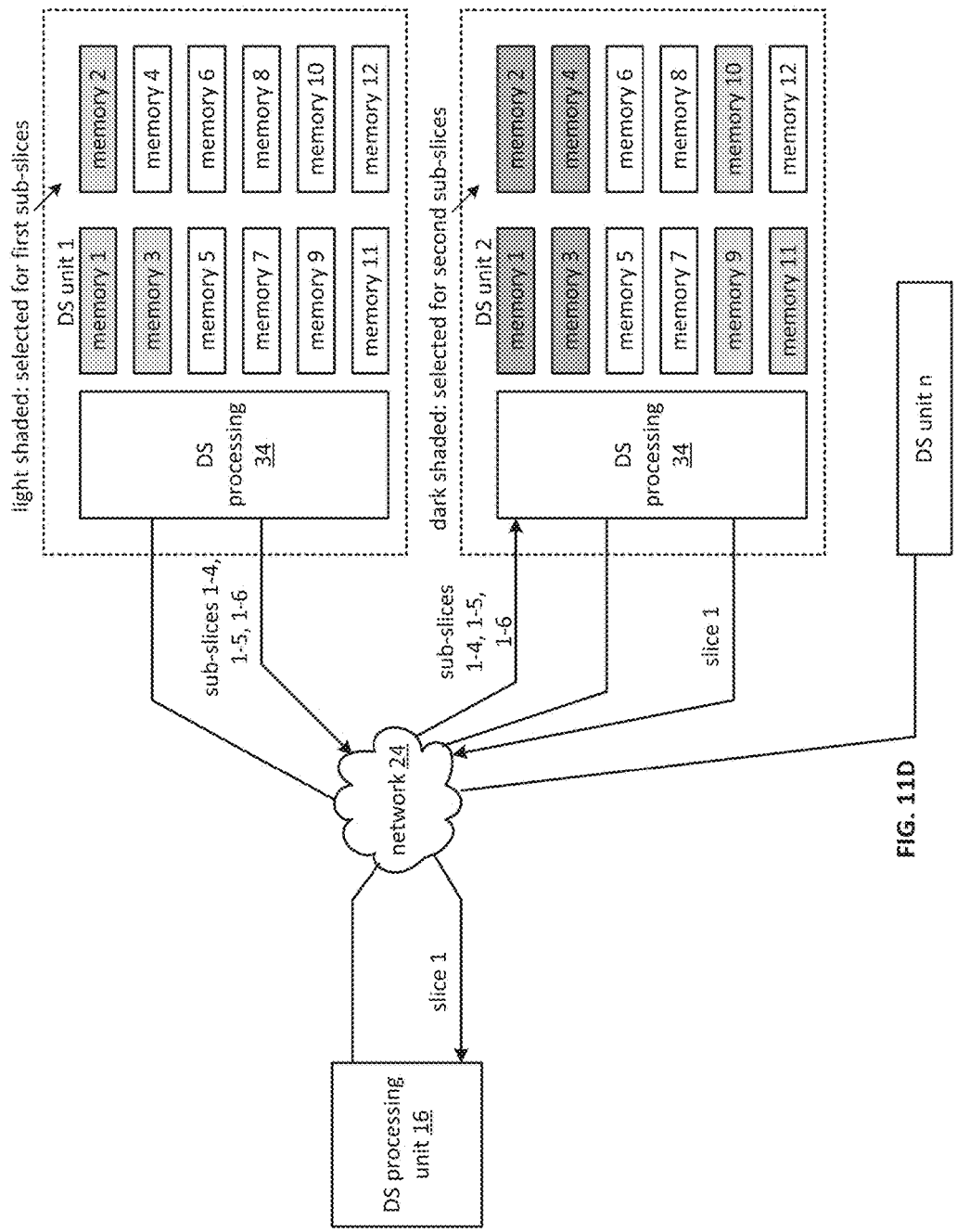
Figure 11E:
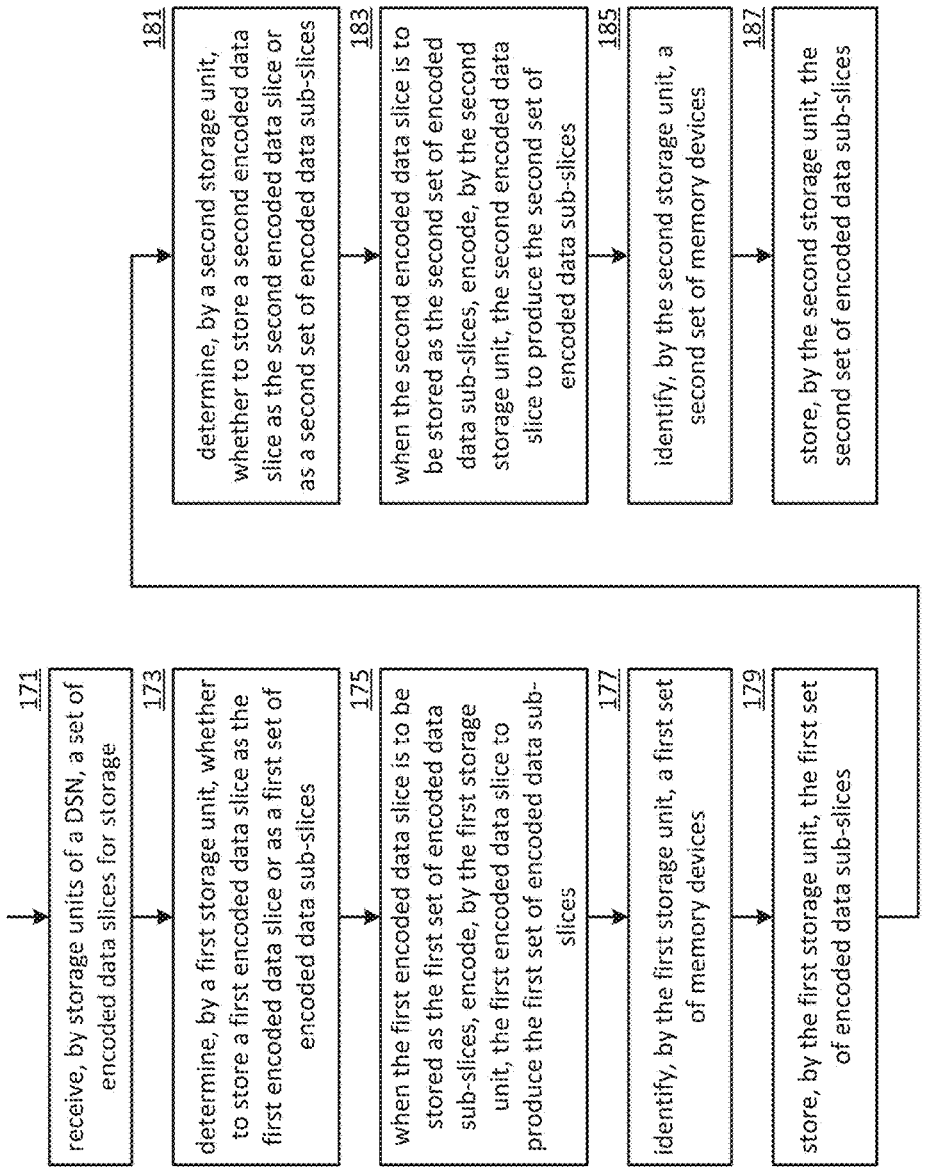
Figure 12:
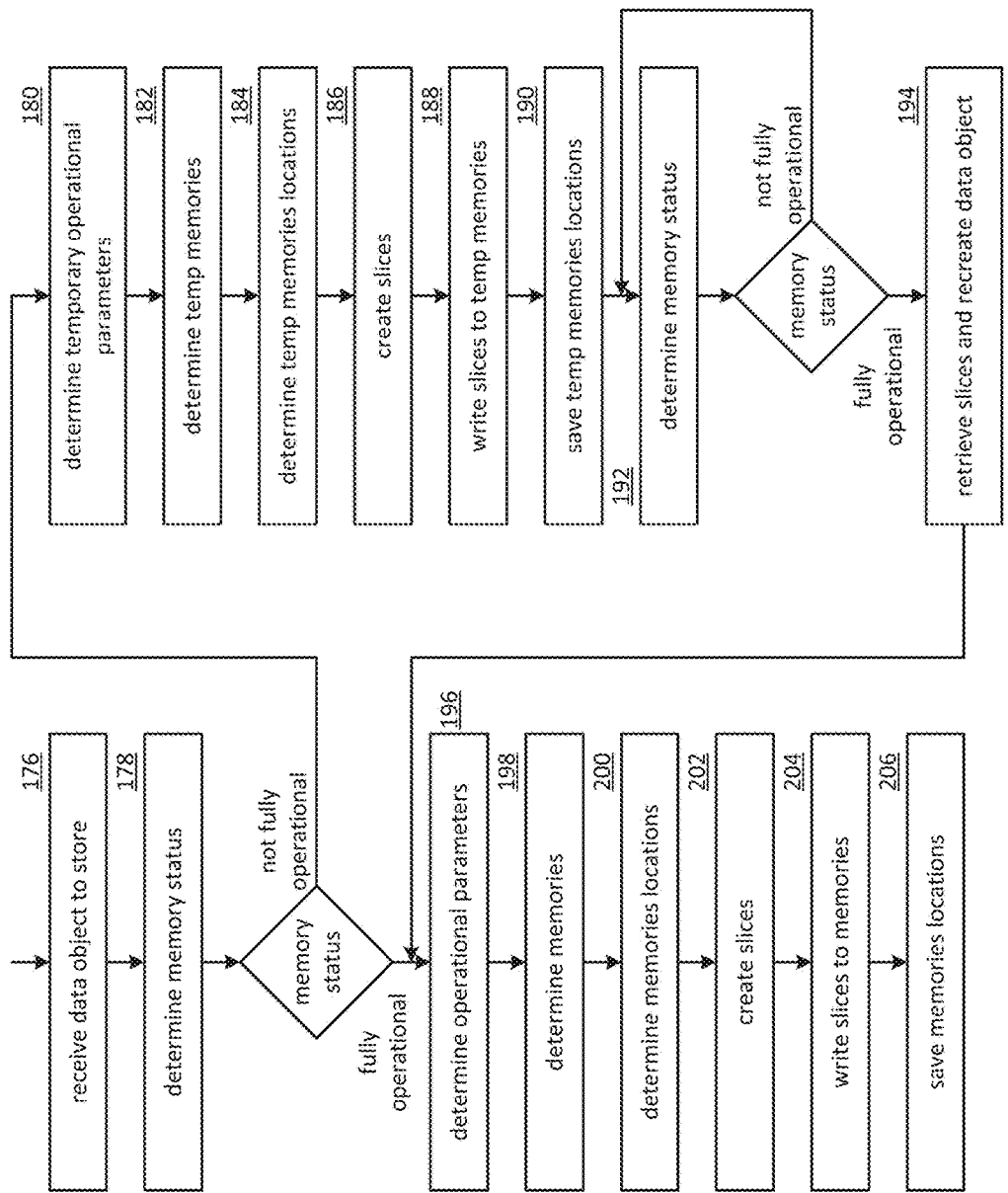
Figure 13:
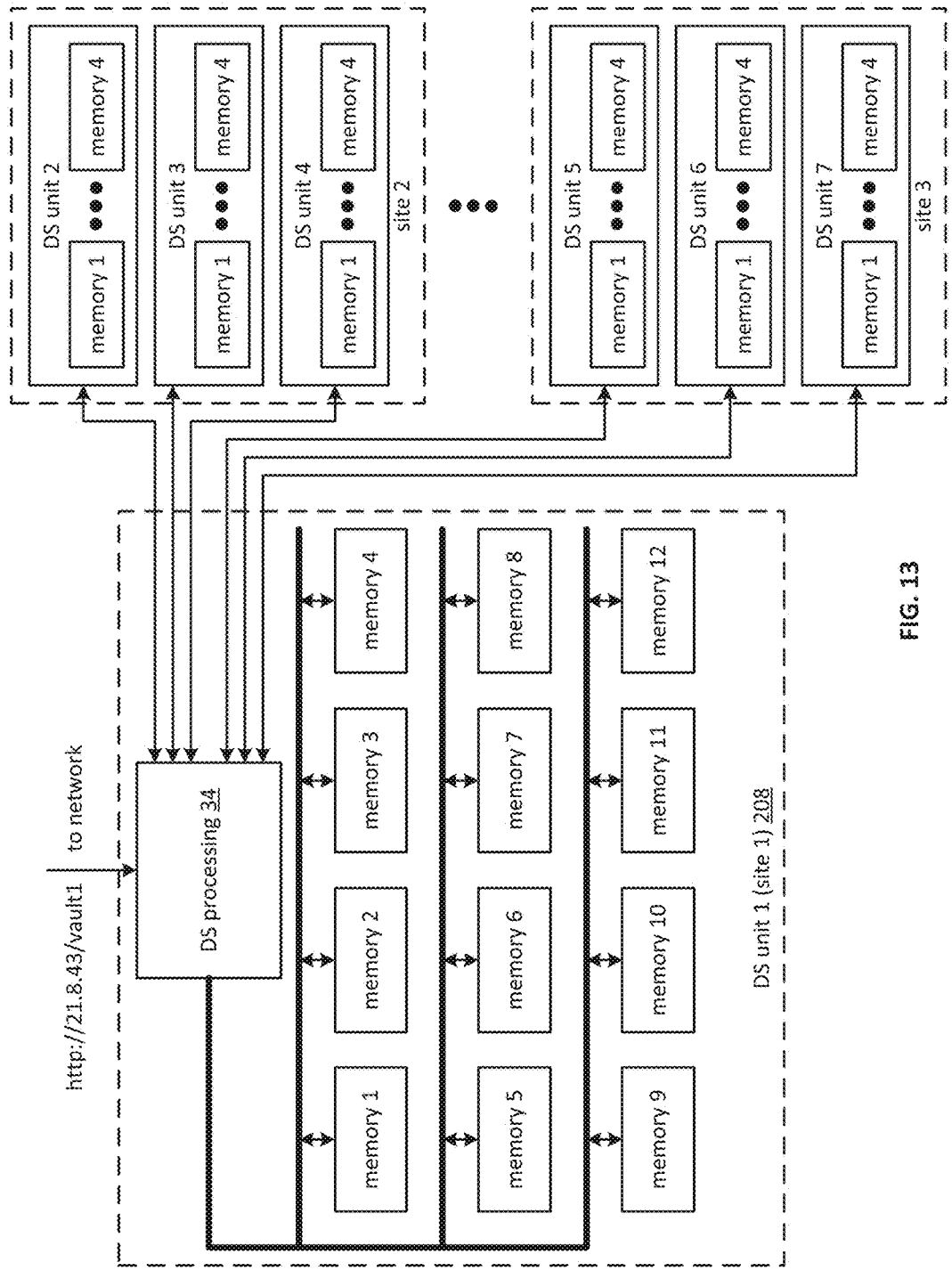
Figure 14:
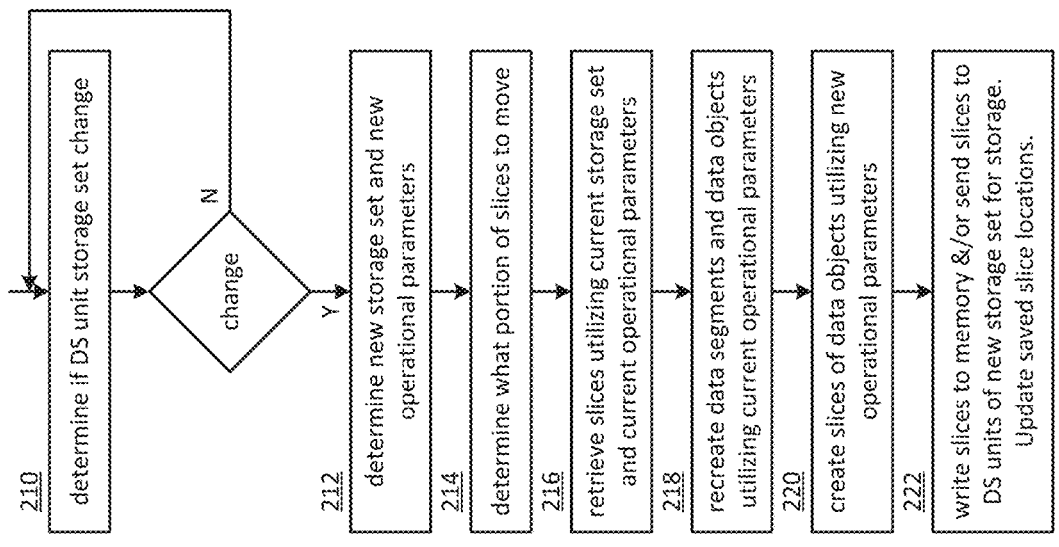
Figure 15A:
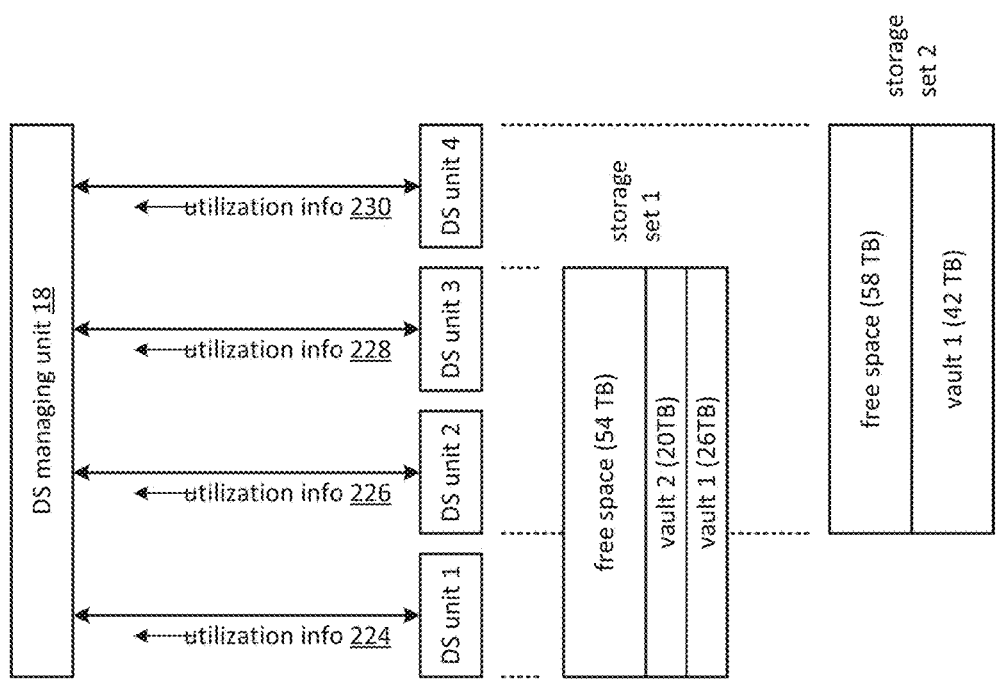
Figure 15B:
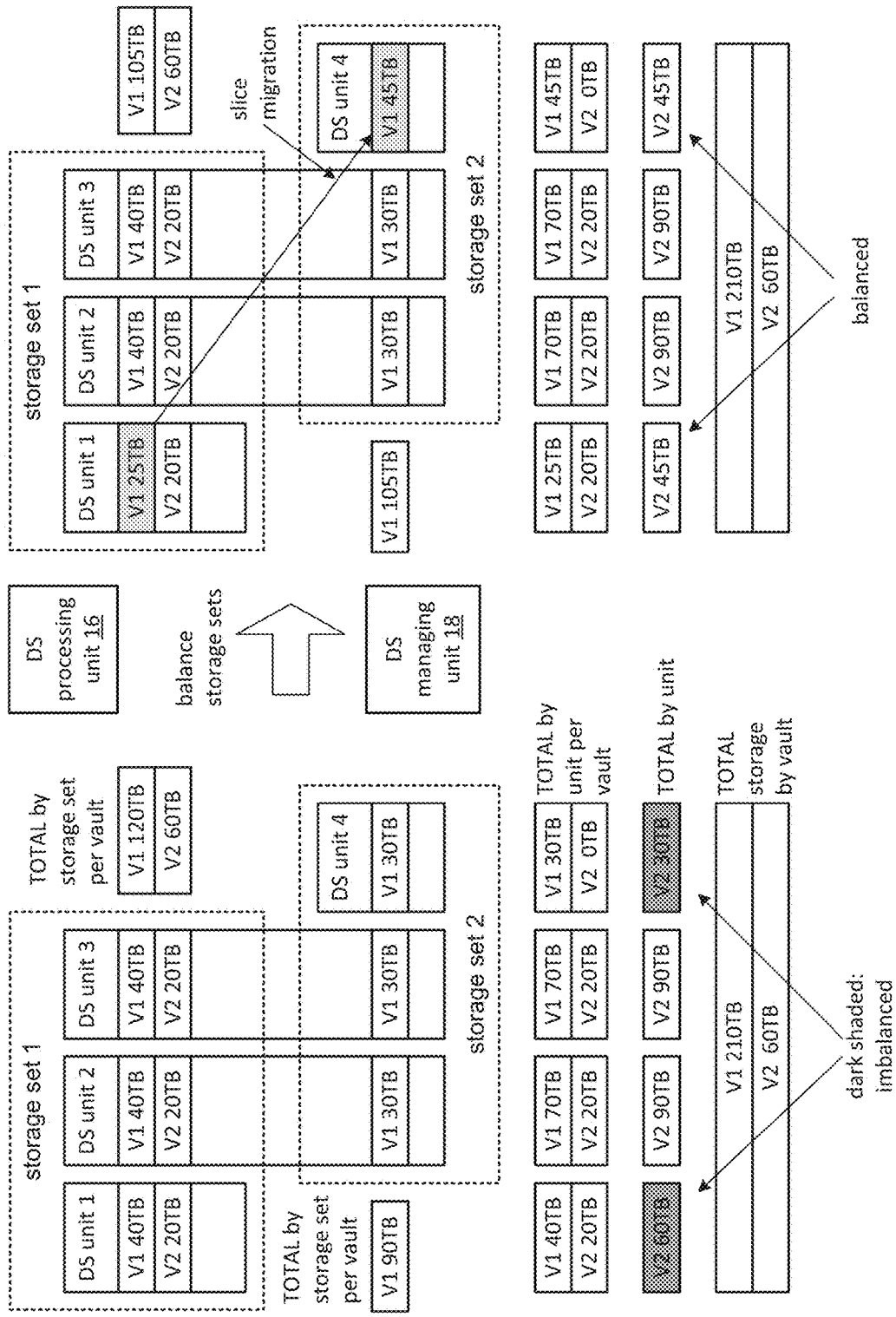
Figure 16A:
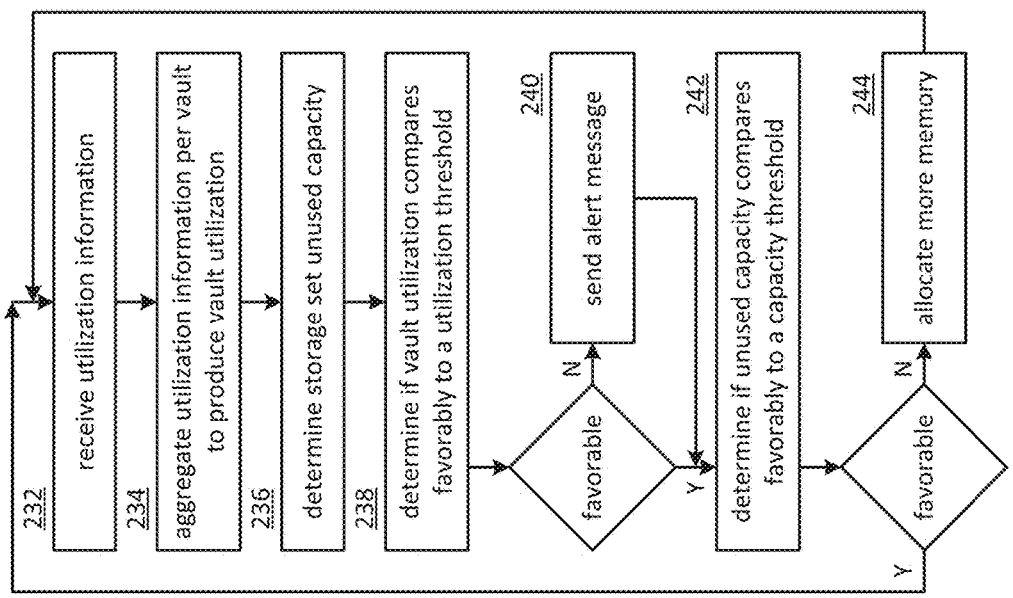
Figure 16B:
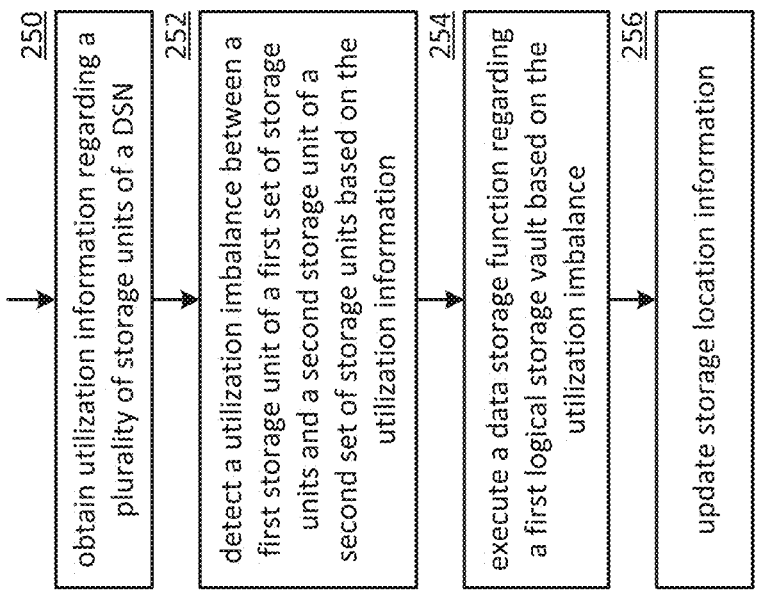

FIGS. 11B-D are schematic block diagrams of an embodiment of a dispersed storage network in accordance with the present invention;

FIG. 11E is a flowchart illustrating another example of storing slices in accordance with the present invention;

FIG. 12 is another flowchart illustrating another example of storing slices in accordance with the present invention;

FIG. 13 is a schematic block diagram of another embodiment of a computing system in accordance with the present invention;

FIG. 14 is a flowchart illustrating an example of distributing slices in accordance with the present invention;

FIG. 15A is a schematic block diagram of another embodiment of a computing system in accordance with the present invention;

FIG. 15B is a schematic block diagram of another embodiment of a computing system in accordance with the present invention;

FIG. 16A is a flowchart illustrating an example of determining memory utilization in accordance with present invention; and FIG. 16B is a flowchart illustrating another example of determining memory utilization in accordance with present invention.

DETAILED DESCRIPTION OF THE INVENTION

Figure 1:
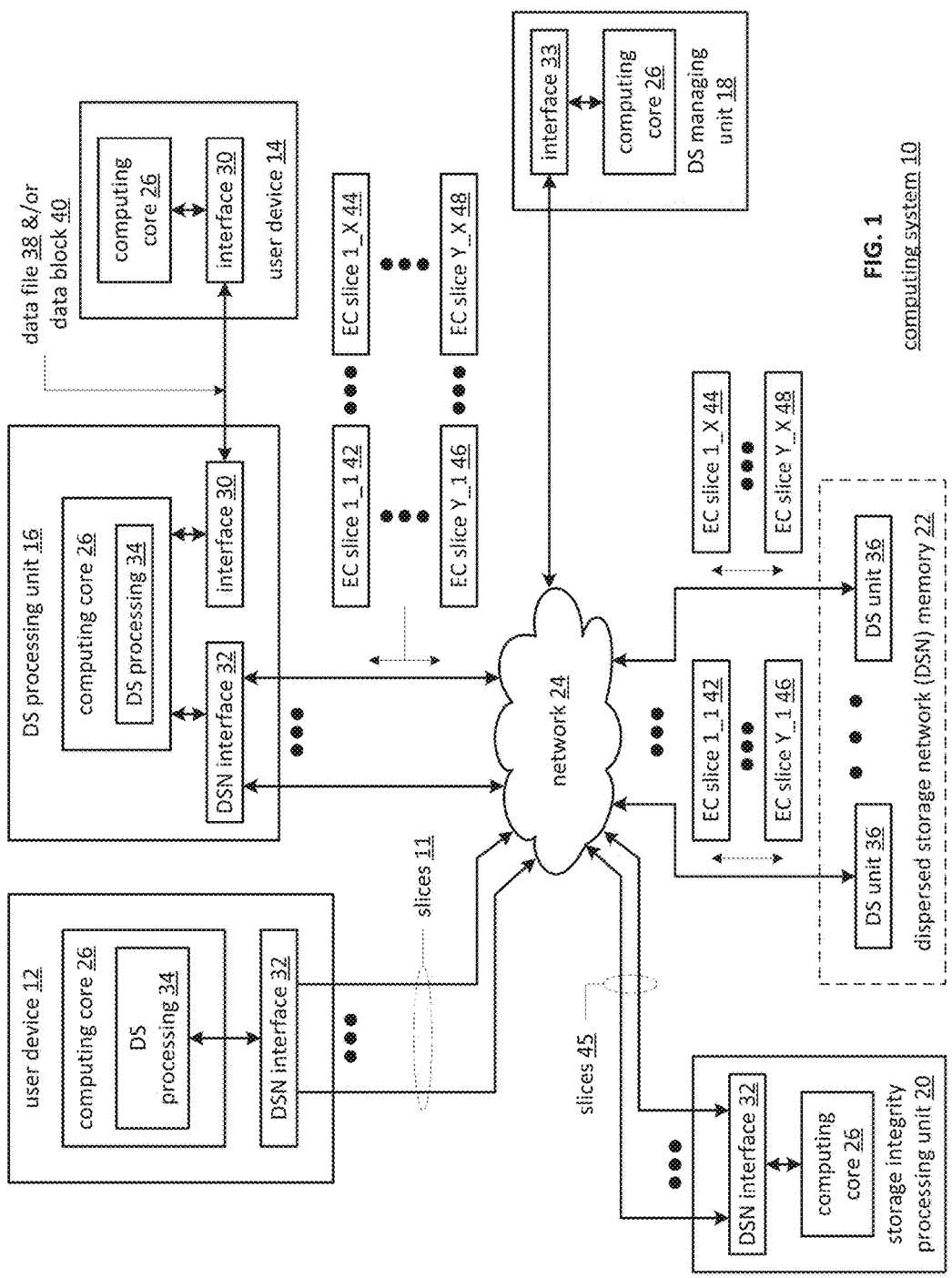
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-16.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-16.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
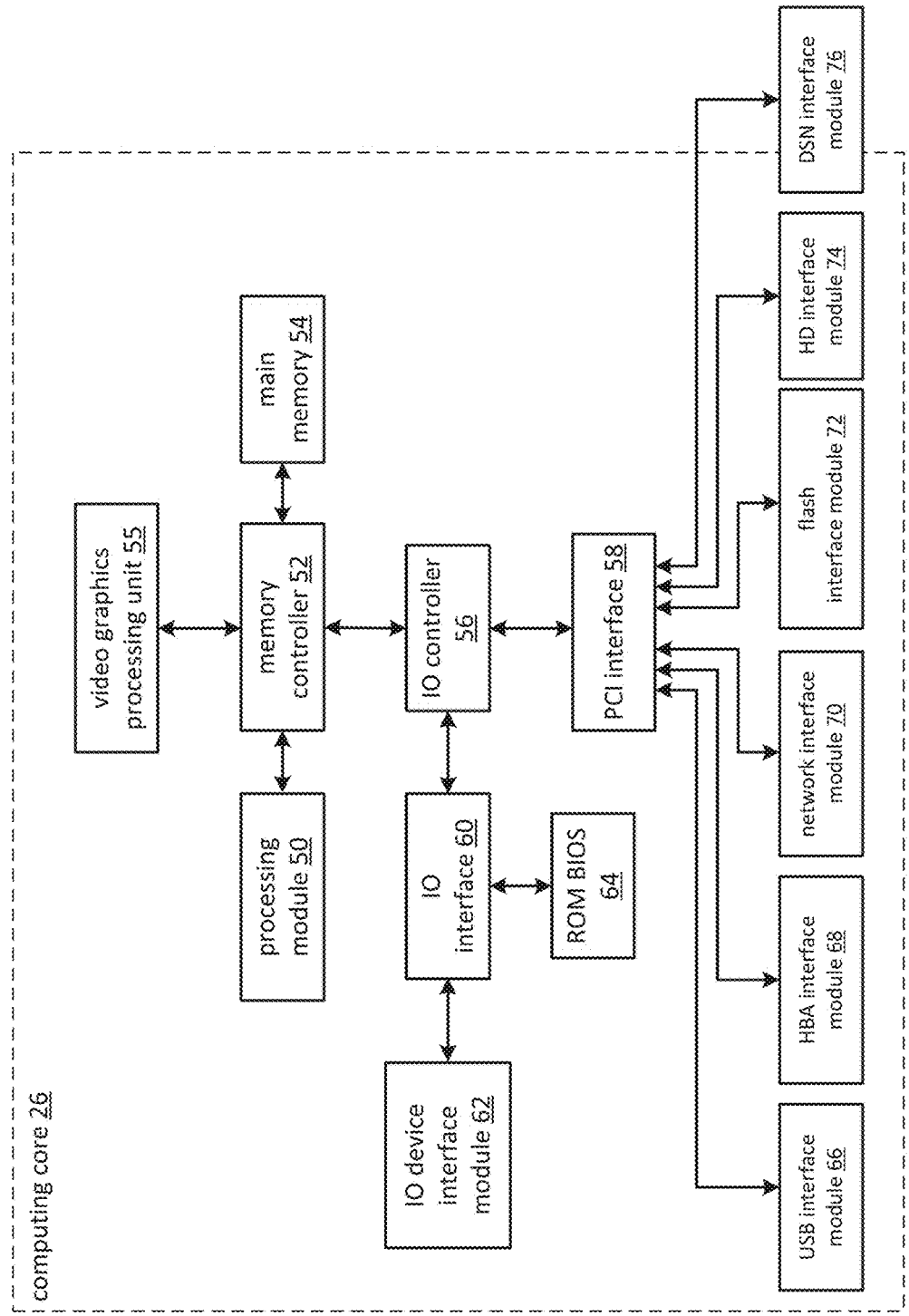
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-16.

Figure 3:
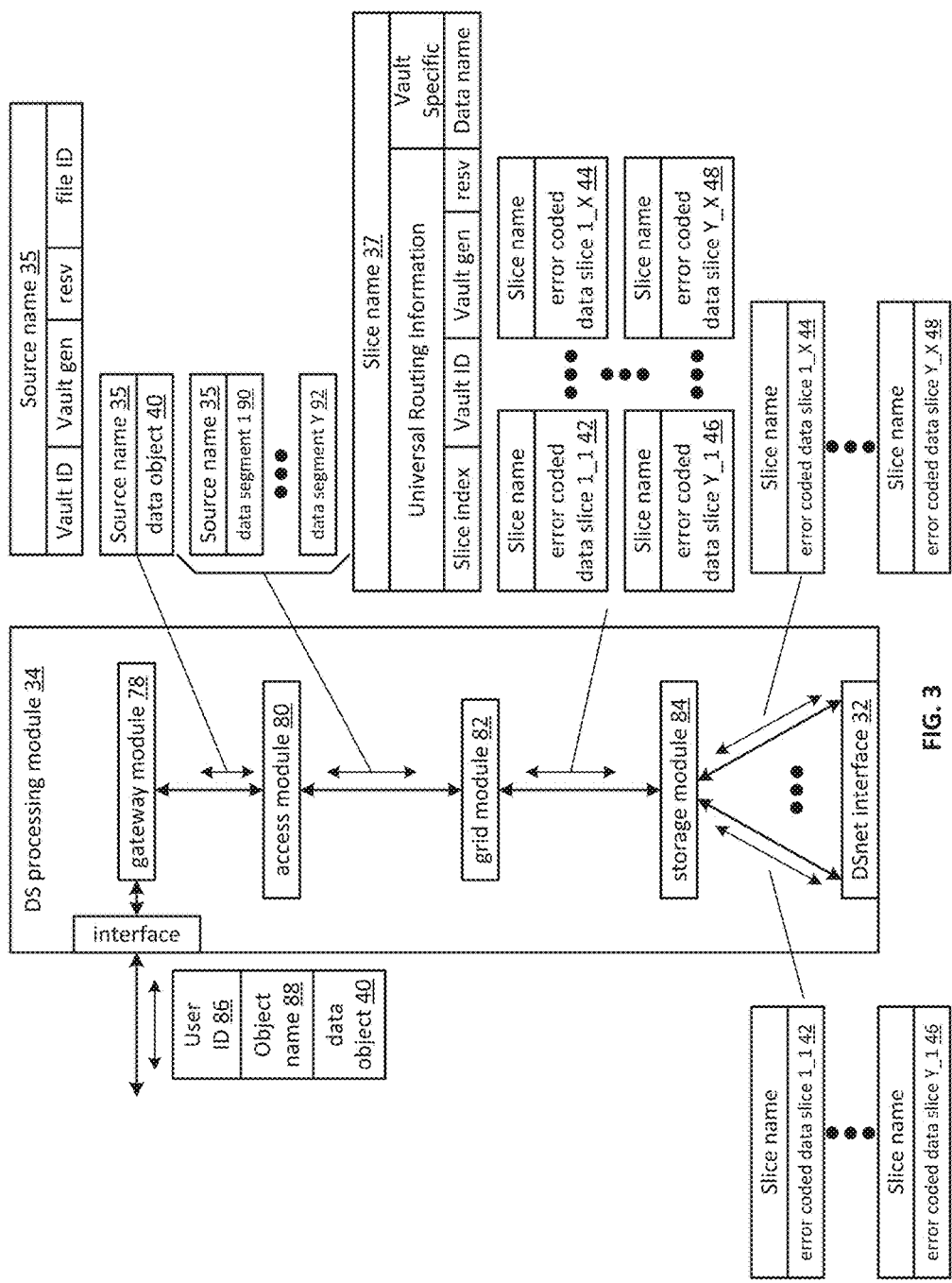
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

FIG. 6 is a schematic block diagram of an embodiment of a dispersed storage (DS) unit. As illustrated, the DS unit 102 includes a storage unit control module 104, a plurality of memories of type A (1 through a), and a plurality of memories of type B (1 through b). The storage unit control module 104 may be implemented with the computing core 26. The memories may be one or more of a magnetic hard disk, NAND flash, read only memory, optical disk, and any other type of read-only or read/write memory. The memories may be implemented as part of or outside of the DS unit 102. For example, memory A-1 may be implemented in the DS unit 102 and memory A-2 may be implemented in a remote server (e.g., a different DS unit operably coupled to the DS unit 102 via the network). In an example, memory A-1 through memory A-a are implemented with the magnetic hard disk technology and memory B-1 through memory B-b are implemented with the NAND flash technology.

As illustrated, the storage unit control module 104 includes the DSnet interface 32, a DS tables and logs memory 106, an operating system (OS) memory 108, and the DS processing 34. The storage unit control module 104 may be operably coupled to the computing system 10 via the DSnet interface 32 by way of the network 24. The storage unit control module 104 receives a store command, metadata, and data to store via the DSnet interface 32. The data may include a simple object file, a block file, and/or error coded data slices. In response, the DS processing 34 of the storage unit control module 14 stores data in memory A and/or memory B. In an example, the DS processing 34 stores the data in the memory A and/or memory B substantially as received (e.g., a data slice is stored as a slice, a block file is stored as a block file, etc.).

In another example, the DS processing 34 encodes a portion of the data in accordance with an error coded dispersal storage function to produce encoded data slices, determines where to store the encoded data slices, and stores the encoded data slices in the memory A and/or memory B. Such a determination may be based on one or more of the metadata, a command (e.g., from a DS processing unit 16 indicating which memory type to use), a type of data indicator, a local virtual DSN address to physical location table lookup, a priority indicator, a security indicator, available memory, memory performance data, memory status, memory cost data, and/or any other parameter to facilitate desired levels of efficiency and performance. For example, the storage unit control module 104 may choose memory A-1 (e.g., a magnetic hard disk drive) to store a received data slice since the performance and efficiency is good enough for the data slice requirements (e.g., availability, cost, response time). In an instance, the DS processing 34 stores the data slices at various addresses across memory A-1. In another instance, the DS processing 34 stores the data slices across more than one of DS unit 102 memories. In another instance, the DS processing 34 stores a threshold k number of the data slices across memory B (for fast retrieval) and the other slicing pillar with minus the threshold number (n–k) updated slices across memory A. In another instance, the DS processing 34 stores the data slices across the DS unit 102 memories and at least one other DS unit at the same site as the DS unit 102. In another instance, the DS processing 34 stores the data slices across the DS unit 102 memories and at least one other DS unit at a different site as the DS unit 102. The method to store and retrieve data slices will be discussed in greater detail with reference to FIGS. 7-9.

The storage unit control module 104 creates and maintains the local virtual DSN address to physical memory table as part of the DS tables 106. The storage unit control module 104 determines where previously stored data slices are located based on the local virtual DSN address to physical memory table. The storage unit control module 104 saves activity records (e.g., memory utilization, errors, stores, retrievals, etc.) as the logs in the DS tables and logs memory 106.

The storage unit control module 104 utilizes the DS processing 34 to distributedly store information from the DS tables and logs 106 and the operating system memory 108 as data slices in memory A and/or memory B to improve the reliability of operation of the DS unit 102. The storage unit control module 104 determines when to distributedly store one or more of the DS tables and logs 106 and the OS memory 108. Such a determination may be based on one or more of a time period has expired since the last store, a command, an error message, a change in the memory architecture (e.g., a new memory device is added), and at least one of the DS tables and logs 106 and OS memory 108 have changed since the last store. The storage unit control module 104 determines where to distributedly store data slices of DS tables and logs 106 and OS memory 108 when the storage unit control module 104 determines to distributedly store the data slices. Such a determination may be based on one or more of a predetermination, a command, a management configuration parameter, a reliability indicator, a memory status indicator, a performance history indicator, DSN memory architecture, and any other factor to optimize the system reliability.

FIG. 7 is a schematic block diagram of another embodiment of a dispersed storage (DS) unit. As illustrated, the DS unit includes a DS processing 34 and a memory A-1. In an example, memory A-1 has one billion bytes of storage capacity. In an example of a storage operation, the DS processing 34 receives 900 bytes of data 109. The DS processing 34 determines an error coded dispersal storage function with a pillar width n=4 and a read threshold=3. The DS processing 34 encodes the data 109 in accordance with the error coded dispersal storage function to produce four data slices (e.g., of the four pillars) where the data slices are each approximately 300 bytes in size. The DS processing 34 determines addressable locations within memory A-1 to store the data slices based on one or more of a lookup of where the last slices were stored, the local virtual DSN address to physical location table, available memory, memory status, a command, memory errors, and the error coded dispersal storage function. In an instance, the DS processing 34 determines to evenly space the pillars apart evenly across the memory A-1 (e.g., spaced apart by 250 megabytes across the 1 gigabyte memory). In another instance, the DS processing 34 determines to utilize memory addresses that avoid known issues as indicated by the memory status for memory A-1 (e.g., 400 mega bytes between pillars 1 and 2 to avoid an issue at address 300 million, 100 mega bytes between pillars 2 and 3, and 150 mega bytes between pillars 3 and 4). Next, the DS processing 34 stores the data slices in the memory A-1 at the addressable locations.

In an example of a re-commissioning operation, a hard disk drive is utilized for a first time period (e.g., three years) within a non-dispersed storage system (e.g., a RAID system). The hard disk drive is re-commissioned in a dispersed storage system at the end of the first time or when a number of disk drive errors exceeds an error threshold. For example, the hard disk drive is removed from the non-dispersed storage system and installed in the dispersed storage system when the hard disk drive is producing too many disk drive errors. A processing module of the DS processing module 34 generates an initial error profile (e.g., reliability of the hard disk drive by addressable storage sectors) and determines a dispersal configuration (including a memory utilization approach) based on the initial error profile. The processing module generates the initial error profile by the generating test data, storing the test data in two or more storage sectors of a set of addressable storage sectors, retrieving the test data from the two or more storage sectors of the set of addressable storage sectors to produce retrieved test data.

Next, the processing module compares the retrieved test data to the test data. The processing module determines that a storage error has been detected when the comparison is unfavorable (e.g., when substantially different). The processing module determines that a storage error has not been detected when the comparison is favorable (e.g., when substantially the same). The processing module produces the initial error profile by listing the detected storage errors and the corresponding addressable storage sectors. The processing module determines the dispersal configuration based on the initial error profile to avoid using addressable storage sectors corresponding to detected storage errors. Note that as the hard disk drive is utilized in the dispersed storage system, the processing module produces an error profile when storage errors are detected and rebuilds stored data within the hard disk drive in accordance with the error profile. The method of operation to rebuild data is discussed below. The method of operation to store data is discussed with reference to FIG. 8. Note that the effective lifespan of the hard disk drive may be extended by utilizing the hard disk drive in the dispersed storage system where overall data reliability is above acceptable levels even though individual hard disk drives may produce errors above unacceptable levels in a non-dispersed storage system.

In an example of a rebuilding operation of a single hard drive, a processing module detects a storage error of an encoded data slice (e.g., an integrity test failure, a checksum test failure, a missing data slice indicator, etc.) of a set of encoded data slices, wherein the set of encoded data slices represents data encoded using an error coding dispersal storage function, wherein the single hard drive is defined to have a set of addressable storage sectors, and wherein encoded data slices of the set of encoded data slices are stored in corresponding addressable storage sectors of the set of addressable storage sectors. In addition, the processing module may detect a plurality of storage errors and determine a rate of increase of the plurality of storage errors. Next, the processing module evaluates the rate of increase of the plurality of storage errors to determine a level of reliability. The processing module determines a second error type when a size of usable storage space is greater than a storage threshold and when the level of reliability compares unfavorably to a reliability threshold.

Alternatively, or in addition to, the processing module detects a storage error of an encoded data slice of a plurality of sets of encoded data slices, wherein the plurality of sets of encoded data slices represents a plurality of data segments each encoded using the error coding dispersal storage function, wherein a first encoded data slice of each of the plurality of sets of encoded data slices is stored in a first addressable storage sector of the set of addressable storage sectors, and wherein a second encoded data slice of each of the plurality of sets of encoded data slices is stored in a second addressable storage sector of the set of addressable storage sectors.

The method of the rebuilding example continues where the processing module updates an error profile based on the storage error(s). The processing module determines a type of error for the storage error. Such a determination of the type of error includes determining an error profile, evaluating the error profile to determine a level of reliability, determining the first error type when the level of reliability compares favorably to a first reliability threshold and determining a second error type when the level of reliability compares unfavorably to the first reliability threshold.

The processing module rebuilds the encoded data slice in accordance with the error coding dispersal storage function to produce a rebuilt encoded data slice when the type of error is a first error type. Next, the processing module stores the rebuilt encoded data slice at a different storage location in the corresponding addressable storage sector of the encoded data slice. The processing module determines a second error coding dispersal storage function when the type of error is a second error type. The processing module re-encodes the set of encoded data slices based on the second error coding dispersal storage function to produce a re-encoded set of encoded data slices. Next, the processing module re-defines addressable storage sectors of the single hard drive in accordance with the second error coding dispersal storage function and an error profile of the single hard drive to produce a re-defined set of addressable storage sectors. The processing module stores the re-encoded set of encoded data slices in corresponding addressable storage sectors of the re-defined set of addressable storage sectors.

Figure 8:
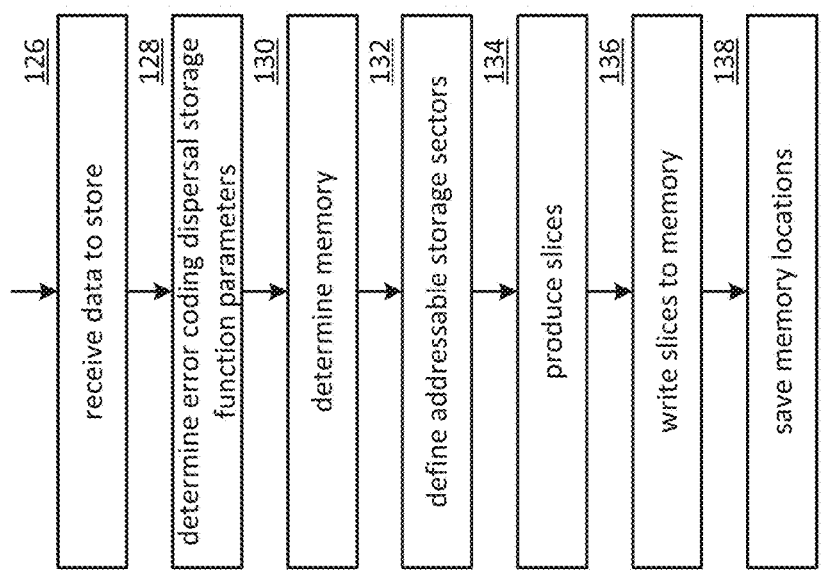
FIG. 8 is a flowchart illustrating an example of storing slices in accordance with the present invention.

FIG. 8 is a flowchart illustrating an example of storing slices. The method begins with step 126 where a processing module receives data to store and metadata. The processing module may receive the data and associated metadata from any one of a user device, a DS processing unit, a DS managing unit, a DS unit, and a storage integrity processing unit. The data may include one or more of an encoded data slice, a data segment, a data object, a data file, and a data stream. The metadata may include one or more of a data object name, a data object size indicator, a slice name, a source name a simple object file name, a block file name, a command, a request a priority indicator, a security indicator, a user identification, a data type, a memory error indicator, a memory availability indicator, and a memory status.

The method continues at step 128 where the processing module determines error coding dispersal storage function parameters. The error coding dispersal storage function parameters may include one or more of a slicing pillar width n, a read threshold k, and encoding algorithm, a slicing method, a pre-data manipulation, and a post-data manipulation. Such a determination may be based on one or more of the metadata, a table lookup, a command, the data object size indicator, a memory status, a memory availability indicator, a priority indicator, a security indicator, a user ID, and the data type. For example, the processing module determines the pillar width n=4 and the read threshold=3 when the table lookup indicates a preference for a 4/3 system and the memory status indicates that the memory is fully operational with no recent storage errors. In another example, the processing module determines the pillar width n=16 and the read threshold=10 when the table lookup indicates a preference for a 16/10 system when there is a history of memory errors and the memory status indicates that the memory has recent errors.

The method continues at step 130 where the processing module determines the memory (e.g., memory ID) to utilize to store data slices which may include one or more of one local memory device, two or more local memory devices (e.g., in the same DS unit), and non-local memory (e.g., in another DS unit). Such a determination may be based on one or more of the metadata, a table lookup, a command, a data object size indicator, a memory status, a memory availability indicator, a priority indicator, a security indicator, a user ID, and a data type. For example, the processing module determines to utilize one memory A-1 when the table lookup indicates a preference for one memory and the memory status indicates that the memory A-1 is fully operational with no recent errors. In another example, the processing module determines to utilize two memories A-1 and B-1 when the table lookup indicates a preference to utilize at least two memory types when there is a history of memory errors and the memory status indicates that the memory A-1 has recent errors.

The method continues at step 132 where the processing module defines addressable storage sectors (e.g., of a single hard drive) to utilize in the determined memory. The processing module defines addressable storage sectors within the single hard drive based on a number of data slices within the set of data slices to produce a set of addressable storage sectors. For example, the processing module defines the addressable storage sectors by one or more of determining utilization of the single hard drive, avoiding an inoperable storage location of the single hard drive, avoiding a storage location of the single hard drive with a history of errors, and avoiding a second storage location of the single hard drive predicted to have a future error.

The method continues with step 132 where the processing module encodes at least a portion of the data in accordance with the error coding dispersal storage function parameters to produce a set of data slices. At step 136, the processing module stores data slices of the set of data slices in corresponding addressable storage sectors of the set of addressable storage sectors. At step 138, the processing module may store one or more slice names of the data slices of the set of data slices, identity of the set of addressable storage sectors, and utilization information associated with the data slices of the set of data slices in a local memory.

Alternatively, or in addition to step 134, the processing module may encode the data in accordance with the error coding dispersal storage function parameters to produce a plurality of sets of data slices. Alternatively, or in addition to step 136, the processing module stores a first data slice of each of the plurality of sets of data slices in a first addressable storage sector of the set of addressable storage sectors and the processing module stores a second data slice of each of the plurality of sets of data slices in a second addressable storage sector of the set of addressable storage sectors. The method to retrieve the slices and recreate the data is discussed in greater detail with reference to FIG. 9.

Figure 9:
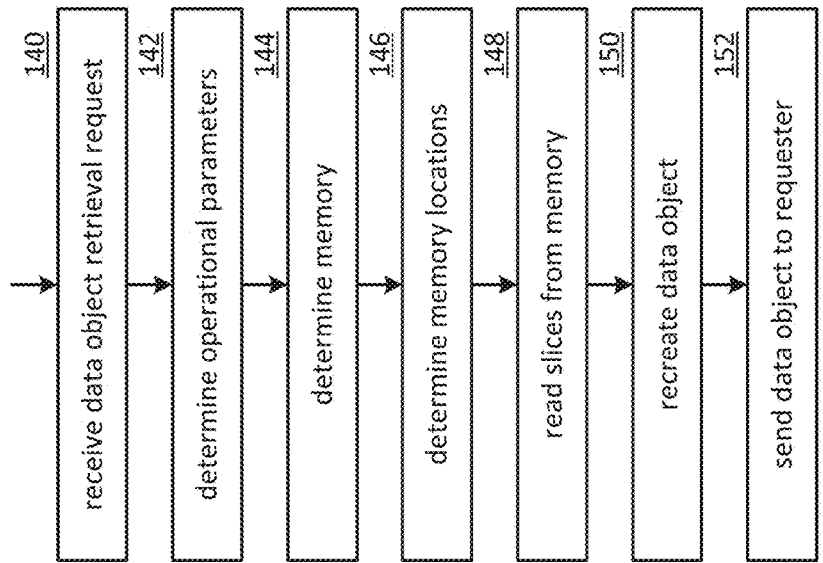
FIG. 9 is a flowchart illustrating an example of retrieving slices in accordance with the present invention.

FIG. 9 is a flowchart illustrating an example of retrieving slices by a processing module where the slices may be stored in one memory. The method begins with step 140 where the processing module (e.g. of a DS processing) receives a data retrieval request from a requester. The requester includes one of the user device, the DS processing unit, the DS managing unit, the DS unit, and the storage integrity processing unit. The processing module receives one or more of the data object name, a data object size indicator, a slice name, a command, a priority indicator, a security indicator, a user ID, and/or a data type with the data object.

The method continues at step 142 where the processing module determines local operational parameters (e.g., error coding dispersal storage function parameters) which may include one or more of the pillar width n, the read threshold, the encoding algorithm, the slicing method, pre-data manipulation, and post-data manipulation. The determination may be based on one or more of a table lookup, a command, the data object size indicator, a memory status, a memory availability indicator, the priority indicator, the security indicator, the user ID, and the data type. For example, the processing module may determine the pillar width n=4 and the read threshold=3 when the table lookup indicates the 4/3 approach was previously utilized when the data object was stored.

The method continues with step 144 where the processing module determines the memory (e.g., memory ID) to retrieve the data slices which may include one or more of one memory in a DS unit, two or more memories in the DS unit, and memory in another DS unit. Such a determination may be based on one or more of the virtual DSN address to physical location table, a table lookup, a command, a data object size indicator, a memory status, a memory availability indicator, a priority indicator, a security indicator, the user ID, and a data type. For example, the processing module determines to retrieve from one memory A-1 when the table lookup indicates a preference for one memory and the memory status indicates that the memory A-1 is fully operational with no recent errors. In another example, the processing module determines to retrieve from two memories A-1 and B-1 when the table lookup indicates a preference to utilize at least two memory types when there is a history of memory errors and the memory status indicates that the memory A-1 has recent errors.

The method continues at step 146 where the processing module determines memory locations (e.g., addresses, addressable storage sectors of a single hard disk drive) to retrieve slices from the determined memory which may include one or more of to an even distribution of pillar locations, all the pillars in sequence starting at one location, a pillar distribution to avoid known memory issues, and a pillar distribution to avoid predicted future memory issues. Such a determination may be based on one or more of the virtual DSN address to physical location table, where last slices were stored, a table lookup, a command, the data object size indicator, a memory status, a memory availability indicator, a priority indicator, a security indicator, a user ID, and a data type. For example, the processing module determines to retrieve from the even distribution of pillars when the table lookup indicates a preference for the even distribution and the memory status indicates that the memory A-1 is fully operational with no recent errors. In another example, the processing module determines to retrieve from the pillar distribution to avoid known memory issues when the table lookup indicates a preference to utilize the pillar distribution to avoid known memory issues when there is a history of memory errors and the memory status indicates that the memory A-1 has recent errors.

The method continues with step 148 where the processing module reads the data slices of the data from the determined memory at the determined addressable locations. At step 150, the processing module decodes the data slices in accordance with the error coding dispersal storage function parameters to recreate the data. At step 152, the processing module sends the data to the requester.

Figure 10A:
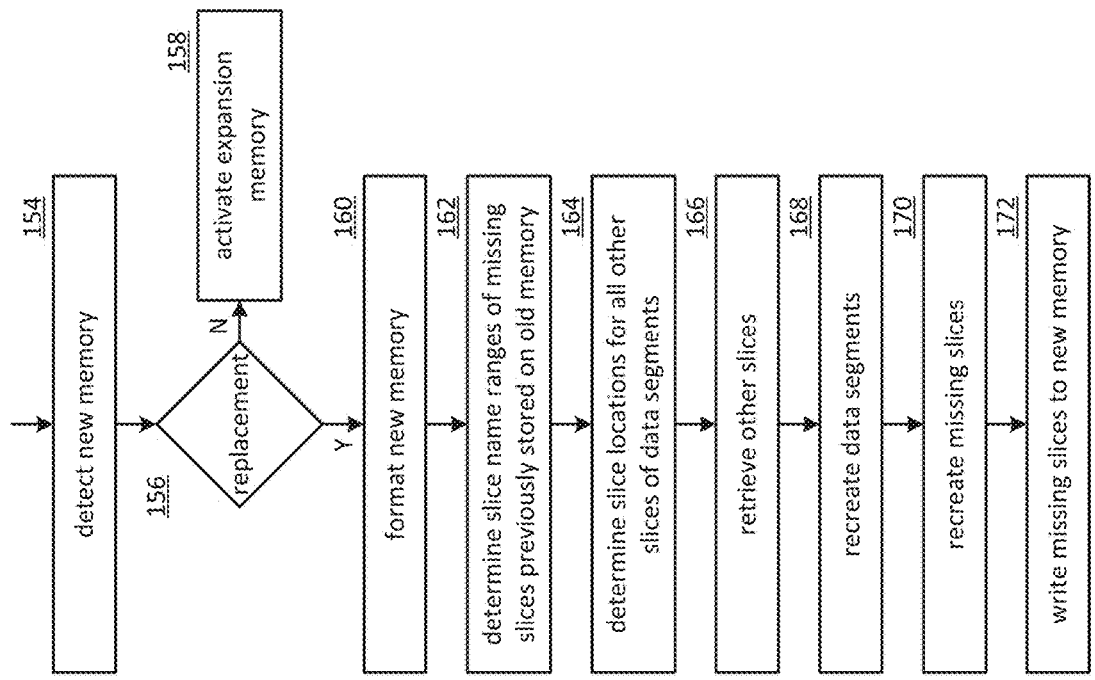
FIG. 10A is a flowchart illustrating an example of rebuilding memory in accordance with the present invention.

FIG. 10A is a flowchart illustrating an example of rebuilding memory by a DS processing where a new memory may be populated with the information that was previously stored on at least one memory device. In an example, a DS unit memory fails and EC data slices are temporarily lost. The DS processing detects a new DS unit memory and stores recreated slices of the lost slices to the new memory.

The method begins with step 154 where the DS processing detects a new memory. Note that a new memory may be a memory that was recently installed to replace a failed memory and/or a memory that was not recently installed but idle until this point. The new memory may be available for utilization by the computing system to store EC data slices. The DS processing detects a new memory by one or more of a message, a command, a DS managing unit message, a configuration lookup, a list, a timed event, a predetermination, and a query.

At step 156, the DS processing determines if the new memory is a replacement memory (e.g., for a failed memory) based on one or more of a message, a command, a DS managing unit message, a configuration lookup, a list, a timed event, a predetermination, and/or a query. For example, the DS processing determines the memory is not a replacement memory when the DS processing queries the DS units and/or memories and determines that they are all accounted for (e.g., actual is the same as a configuration lookup) with no failed memories. In another example, the DS processing determines the memory is a replacement memory when the DS processing queries the DS units and/or memories and determines that at least one memory is not active (e.g., actual is not the same as a configuration lookup). The method branches to step 160 when the DS processing determines that the new memory is a replacement memory. The method continues to step 158 when the DS processing determines that the new memory is not a replacement memory. At step 158, the DS processing activates the memory in accordance with a memory expansion method to format the memory and add the memory to an appropriate storage set(s) that require more capacity.

The method continues at step 160 where the DS processing formats the new memory when the DS processing determines that the new memory is a replacement memory. In an instance, DS processing formats the memory by writing the same information to all memory addresses (e.g., all zeroes, all ones, a pattern of ones and zeroes).

At step 162, the DS processing determines the slice name ranges of missing slices previously stored on the missing memory (e.g., a failed, inactivated, and/or removed memory). Such a determination may be based on one or more of a lookup in the local virtual DSN address to physical location table, a message, a command, a DS managing unit message, a configuration lookup, a list, a predetermination, and a query.

At step 164, the DS processing determines the slice locations (e.g., on the same and/or other DS units) for all other slices of the data segments of the slice name ranges of missing slices. Such a determination may be based on one or more of the slice name ranges of missing slices, a lookup in the local virtual DSN address to physical location table, a lookup in the virtual DSN address to physical location table, a message, a command, a DS managing unit message, a configuration lookup, a list, a predetermination, and/or a query.

The method continues at step 166 where the DS processing sends a retrieve slice command with slice names for all other slices of the data segments of the slice name ranges of missing slices to the determined slice locations. The DS processing receives the slices in response. At step 168, the DS processing recreates the data segments by de-slicing and decoding the received slices in accordance with the operational parameters affiliated with the slice names. In an instance, the DS processing determines the operational parameters affiliated with the slice names by a user vault lookup.

At step 170, the DS processing recreates the missing slices by encoding and slicing data segments in accordance with the operational parameters. Note that the slices of the other pillars may remain stored as they were prior to this method. Alternatively, the DS processing creates all new slices for every pillar by encoding and slicing data segments in accordance with new operational parameters. Note that the slices are stored to the pillar(s) in the present memory and of the other pillars to replace the previously stored slices (e.g., prior to this method). The DS processing determines the new operational parameters based on one or more of the a memory status indicator, a message, a command, a DS managing unit message, a configuration lookup, a list, a timed event, a predetermination, and a query. For example, the DS processing determines the new operational parameters to have more reliability than previously when the memory failed.

At step 172, DS processing writes the missing slices to the new memory and saves the stored locations in the local virtual DSN address to physical location table. Note that the new memory may have more capacity that the missing memory it is replacing. The DS processing may make the extra memory capacity available to one or more storage sets when the missing slices have been be replaced as described above.

Figure 10B:
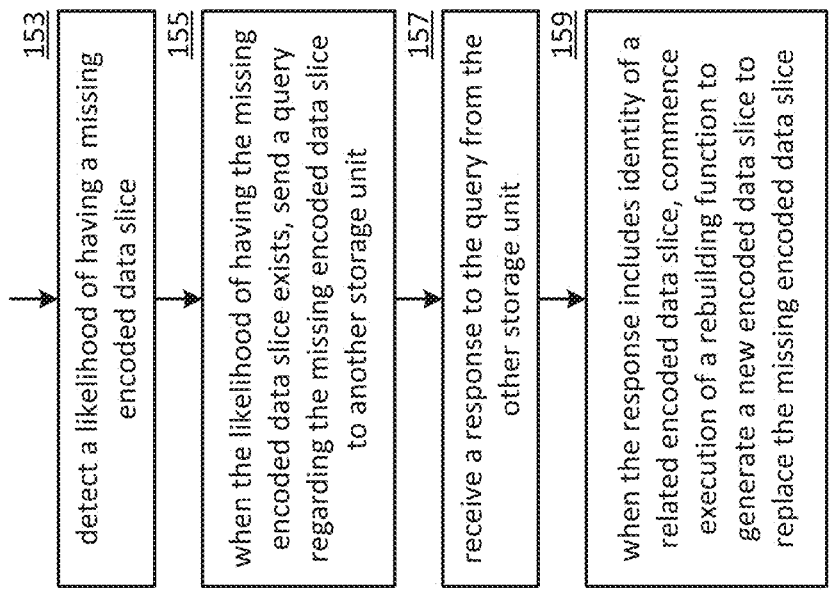
FIG. 10B is a flowchart illustrating another example of rebuilding memory in accordance with the present invention.

FIG. 10B is a flowchart illustrating another example of rebuilding memory. In particular, a method is presented for use in conjunction with one or more functions and features described in conjunction with FIGS. 1-10A and also FIG. 10B. The method includes step 153 where a processing module (e.g., of a storage unit of a dispersed storage network (DSN)) detects a likelihood of having a missing encoded data slice based on local physical to DSN address mapping information. As a specific example, the processing module detects the likelihood of having a missing encoded data slice by detecting replacement of a failed memory device. As another specific example, the processing module interprets the local physical to DSN address mapping information to determine that a sub-range of DSN addresses has a disproportionate amount of encoded data slices having DSN addresses in the sub-range of DSN addresses to other sub-ranges of DSN addresses. For instance, the processing module detects the likelihood when the sub-range of DSN addresses includes no encoded data slices having DSN addresses in the sub-range of DSN addresses. As yet another specific example, the processing module interprets the local physical to DSN address mapping information to determine that a sub-range of DSN addresses is not affiliated with a particular memory device of the storage unit.

When the likelihood of having the missing encoded data slice exists, the method continues at step 155 where the processing module sends a query regarding the missing encoded data slice to another storage unit of the DSN. As a specific example, the processing module sends the query to the other storage unit, where the query includes a request for the related encoded data slice. As another specific example, the processing module sends the query to storage units of the DSN, where the query includes a request for other related encoded data slices of the set of encoded data slices.

The method continues at step 157 where the processing module receives a response to the query from the other storage unit. As a specific example, when the processing module sent the query to include the request for the related encoded data slice, the processing module receives, as the response, the related encoded data slice from the other storage unit. As another specific example, when the processing module sends the query to include the request for other related encoded data slices, the processing module receives, as a set of responses, the other related encoded data slices.

When the response includes identity of a related encoded data slice of a set of encoded data slices, the method continues at step 159 where the processing module commences execution of a rebuilding function to generate a new encoded data slice to replace the missing encoded data slice. A data segment of a data object is encoded into the set of encoded data slices, where a threshold number of encoded data slices of the set of encoded data slices is required to recover the data segment. The threshold number is less than a number of encoded data slices in the set of encoded data slices. The other storage unit stores the related encoded data slice, where the storage unit has been assigned to store a second encoded data slice of the set of encoded data slices, and where the second encoded data slice corresponds to the missing encoded data slice.

As a specific example of commencing execution of the rebuilding function, when the processing module sends the query to include the request for other related encoded data slices, and when the related encoded data slice and the other related encoded data slices amounts to the threshold number, the processing module decodes the related encoded data slice and the other related encoded data slices to recapture the data segment and encodes the data segment to create the new encoded data slice.

As another specific example of the commencing the execution of the rebuilding function, the processing module sends requests to storage units of the DSN regarding other related encoded data slices of the set of encoded data slices and receives, as a set of responses, the other related encoded data slices. When the related encoded data slice and the other related encoded data slices amounts to the threshold number, the processing module decodes the related encoded data slice and the other related encoded data slices to recapture the data segment and encodes the data segment to create the new encoded data slice.

The method described above in conjunction with a storage unit can alternatively be performed by other modules of a dispersed storage network or by other devices. In addition, at least one memory section that stores operational instructions that can, when executed by one or more processing modules of one or more computing devices of a dispersed storage network (DSN), cause the one or more computing devices to perform any or all of the method steps described above.

FIG. 11A is a schematic block diagram of another embodiment of a dispersed storage unit 174 that includes a DS processing 34 and a plurality of memories 1-12. The DS processing 34 may be implemented with the computing core 26. The memories 1-12 may be one or more of a magnetic hard disk, NAND flash, read only memory, optical disk, and any other type of read-only or read/write memory. The memories 1-12 may be implemented as part of or outside of the DS unit 174. For example, memories 1-4 may be implemented in the DS unit 174 and memories 5-12 may be implemented in a remote server (e.g., a different DS unit operably coupled to the DS unit 174 via the network). In another example, memories 1-8 are implemented with the magnetic hard disk technology and memories 9-12 are implemented with the NAND flash technology.

The DS processing 34 may be operably coupled to the computing system via the network 24. The DS processing 34 may receive a store command, metadata, and a data object to store. The data object may include a simple object file, a block file, and/or EC data slices. In an example, the DS processing stores the data object in one or more of the memories 1-12 substantially as received (e.g., a slice is stored as a slice, a block file is stored as a block file, etc.). In another example, the DS processing 34 creates EC data slices of the data object and stores the slices in one or more of the memories 1-12 as slices. Note that the DS processing unit determines to utilize only the memories 1-12 of the DS unit 174 when the capabilities of memories 1-12 substantially meet the requirements. In another example, a DS processing unit may determine to utilize a combination of the memories 1-12 of the DS unit 174 and memory of at least one other DS unit when the capabilities of memories 1-12 alone substantially do not meet the requirements. The method to determine the memories to utilize is discussed in greater detail with reference to FIGS. 11B-12.

In an example, the DS processing 34 determines where (e.g., which address of one or more of the memories) to store the received data object as EC data slices. The determination may be based on one or more of the metadata, a command (e.g., from the DS processing unit indicating which memory type to use), a type of data indicator, a local virtual DSN address to physical location table lookup, a priority indicator, a security indicator, available memory, memory performance data, memory status, memory cost data, and any other parameter to facilitate desired levels of efficiency and performance. For example, the DS processing 34 may choose memories 1-12 (e.g., magnetic hard disk drives) to store the EC data slices since the performance and efficiency is good enough for the requirements (e.g., availability, cost, response time). In another example, the DS processing 34 distributes the data slices to memories 1-10 when memories 11 and 12 are not available. In another example, the DS processing 34 distributes the slices at various addresses across one memory. In another example, the DS processing 34 distributes a read threshold k=8 of the slices across memories 1-8 (for fast retrieval) and the other 4 (n−k) slices other DS units. In yet another example, the DS processing 34 distributes the slices across the DS unit memories and at least one other DS unit at the same site as the DS unit 174. In yet another example, the DS processing 34 distributes the slices across the DS unit 174 memories and at least one other DS unit at a different site as the DS unit 174.

The DS processing 34 utilizes a temporary set of operational parameters and a temporary set of memory choices when the memory capabilities do not meet the needs of the requirements (e.g., when a memory has failed). The method to determine the memories to utilize is discussed in greater detail with reference to FIGS. 11B-12. The DS processing 34 creates and maintains the local virtual DSN address to physical memory table. The DS processing module 34 determines where previously stored EC data slices are located based on the local virtual DSN address to physical memory table upon receiving a retrieve command via the network. Note that the DS unit access may be via a WebDAV sequence, e.g., via an IP address such as http://21.8.43/vault1 to facilitate easy DS unit access.

FIGS. 11B-D are schematic block diagrams of an embodiment of a dispersed storage network (DSN) illustrating another example of operation of the dispersed storage unit 174 of FIG. 11A. The DSN includes the dispersed storage (DS) processing unit 16 of FIG. 1, the network 24 FIG. 1, and a set of DS units 1-n. Each DS unit may be implemented utilizing the DS unit 174 of FIG. 11A. The DSN functions to store data in the set of DS units 1-n.

FIG. 11B illustrates steps of a method to store the data. In an example of operation, the DS processing unit 16 dispersed storage error encodes a data segment of the data into a set of encoded data slices and sends, via the network 24, the set of encoded data slices to the DS units 1-n. Hereafter, each DS unit may be interchangeably referred to as a storage unit. Storage units of the DSN (e.g., DS units 1-n), receive the set of encoded data slices for storage. For example, DS unit 1 (e.g., a first storage unit) receives a first encoded data slice, DS unit 2(e.g., a second storage unit) receives a second encoded data slice, etc.

Having received the first encoded data slice, the DS processing 34 of the first storage unit determines whether to store the first encoded data slice of the set of encoded data slices as the first encoded data slice or as a first set of encoded data sub-slices. The determination may be based on one or more of metadata, a command (e.g., from the DS processing unit 16 indicating which memory type to use), a type of data indicator, a local virtual DSN address to physical location table lookup, a priority indicator, a security indicator, available memory, memory performance data, memory status, memory cost data, and any other parameter to facilitate desired levels of efficiency and performance.

When the first encoded data slice is to be stored as the first set of encoded data sub-slices, the DS processing 34 of the first storage unit encodes the first encoded data slice in accordance with a first dispersed storage error encoding function to produce the first set of encoded data sub-slices. As a specific example, the DS processing 34 of the first storage unit determines a desired redundancy level and when the desired redundancy level is based on assurances against memory device failure with the first storage unit, the DS processing 34 of the first storage unit determines the first dispersed storage error encoding function based on the desired redundancy level, where the first dispersed storage error encoding function includes a pillar width number of n, a decode threshold number of k, and where n–k is less than n/2. For instance, the DS processing 34 of the first storage unit determines the first dispersed storage error encoding function to include a pillar width of 4 and a decode threshold number of 3 and encodes the first encoded data slice to produce encoded data sub-slices 1-1 through 1-4.

Having produced the first set of encoded data sub-slices, the DS processing 34 of the first storage unit identifies a first set of memory devices within the first storage unit. For example, the DS processing 34 of the first storage unit identifies memories 1-4 of the first storage unit as the first set of memory devices when memories 1-4 are available. Having identified the first set of memory devices, the DS processing 34 of the first storage unit stores the first set of encoded data sub-slices in the first set of memory devices. For example, the DS processing 34 of the first storage unit stores the encoded data sub-slices 1-1 through 1-4 in the memory devices 1-4 of the first storage unit.

The DS processing 34 of the second storage unit determines whether to store the second encoded data slice of the set of encoded data slices as the second encoded data slice or as a second set of encoded data sub-slices. When the second encoded data slice is to be stored as the second set of encoded data sub-slices, the second storage unit encodes the second encoded data slice in accordance with a second dispersed storage error encoding function to produce the second set of encoded data sub-slices. Having produced the second set of encoded data sub-slices, the second storage unit identifies a second set of memory devices within the second storage unit. For example, the second storage unit identifies memories 1-4 of the second storage unit. Having identified the second set of memory devices, the second storage unit stores the second set of encoded data sub-slices in the second set of memory devices.

FIG. 11C illustrates further steps of the method to store the data. In an example of operation, the DS processing 34 of the first storage unit determines to store an encoded data sub-slice of the first set of encoded data sub-slices in a memory device of another storage unit of the storage units, where the other storage unit is the second storage unit or a different one of the storage units. The determining may be based on one or more determination criteria from a list of determination criteria. The list of determination criteria includes determining that the first storage unit has less than a desired amount of available memory, determining that the first storage unit has more than a desired number of memory device with an age issue, and determining that the other storage unit has more available storage than the first storage unit.

Having determined to store the encoded data sub-slice in the other storage unit, the DS processing 34 of the first storage unit selects the other storage unit based on one or more selection criteria from a list of selection criteria. The list of selection criteria includes a query and response with the other storage unit, a pre-established relationship, an ad hoc established relationship, and a determination that the other storage unit has a sufficient amount of available memory. For example, the DS processing 34 of the first storage unit selects the second storage unit when the second storage unit has the sufficient amount of available memory.

Having selected the other storage unit, the DS processing 34 of the first storage unit sends, via the network 24, the encoded data sub-slice to the other storage unit. For example, the first storage unit sends encoded data sub-slice 1-4 of encoded data sub-slices 1-1 through 1-4 to the second storage unit for storage. For instance, the DS processing 34 of the second storage unit stores the encoded data sub-slice 1-4 in memory 7 when memory 7 has the sufficient amount of available memory.

Having sent the encoded data sub-slice to the other storage unit, the DS processing 34 of the first storage unit stores remaining encoded data sub-slices of the first set of encoded data sub-slices in a set of memory devices within the first storage unit. For example, the DS processing 34 the first storage unit stores encoded data sub-slices 1-1 through 1-3 in memories 1-3 of the first storage unit.

FIG. 11D illustrates further steps of the method to store the data. In an example of operation, the DS processing 34 of the first storage unit determines the desired redundancy level. When the desired redundancy level is based on assurances against failure of the first storage unit, the DS processing 34 of the first storage unit determines the first dispersed storage error encoding function based on the desired redundancy level, where the first dispersed storage error encoding function includes a pillar width number of n, a decode threshold number of k, and where n–k is equal to or greater than n/2. For example, the DS processing 34 of the first storage unit determines the first dispersed storage error encoding function to include a pillar width number of 6 and a decode threshold number of 3.

Having determined the first dispersed storage error encoding function, the DS processing 34 of the first storage unit encodes the first encoded data slice to produce the set of encoded data sub-slices. For example, the DS processing 34 of the first storage unit encodes the first encoded data slice to produce encoded data sub-slices 1-1 through 1-6 when the pillar width number is 6. Having produced the set of encoded data sub-slices, the DS processing 34 of the first storage unit sends at least n/2 encoded data sub-slices of the first set of encoded data sub-slices to another storage unit, where the other storage unit is the second storage unit or a different one of the storage units. For example, the DS processing 34 of the first storage unit sends encoded data sub-slices 1-4, 1-5, and 1-6 to a second storage unit for storage. The DS processing 34 of the second storage unit stores the encoded data sub-slices 1-4, 1-5, and 1-6 in memories 9, 10, and 11 when memories 9, 10, and 11 are half the sufficient amount of available memory. Having sent the at least n/2 encoded data sub-slices of the first set of encoded data sub-slices to the other storage unit, the DS processing 34 of the first storage unit stores remaining encoded data sub-slices in memories of the first storage unit. For example, the DS processing 34 of the first storage unit stores encoded data sub-slices 1-1, 1-2, and 1-3 in memories 1-3 of the first storage unit.

The DS processing unit 16, upon a recovery operation to recover the data segment, receives the first encoded data slice from at least one of the first storage unit and the second storage unit in response to a read slice request. For example, the DS processing 34 of the second storage unit retrieves the encoded data sub-slices 1-4, 1-5, and 1-6 from the memories 9-11 of the second storage unit, decodes the retrieved encoded data sub-slices to reproduce the first encoded data slice, and sends, via the network 24, the reproduced first encoded data slice to the DS processing unit 16.

FIG. 11E is a flowchart illustrating another example of storing slices. In particular, a method is presented for use in conjunction with one or more functions and features described in conjunction with FIGS. 1-11D and also FIG. 11E. The method includes step 171 where one or more processing modules of one or more storage units of a dispersed storage network (DSN) receives a set of encoded data slices for storage, where a data segment of data is dispersed storage error encoded into the set of encoded data slices. The method continues at step 173 where a processing module of a first storage unit of the storage units determines whether to store a first encoded data slice of the set of encoded data slices as the first encoded data slice or as a first set of encoded data sub-slices.

When the first encoded data slice is to be stored as the first set of encoded data sub-slices, the method continues at step 175 where the processing module of the first storage unit encodes the first encoded data slice in accordance with a first dispersed storage error encoding function to produce the first set of encoded data sub-slices. As a specific example, the processing module of the first storage unit determines a desired redundancy level and when the desired redundancy level is based on assurances against memory device failure with the first storage unit, the processing module of the first storage unit determines the first dispersed storage error encoding function based on the desired redundancy level, where the first dispersed storage error encoding function includes a pillar width number of n, a decode threshold number of k, and where n−k is less than n/2.

As another specific example, having determined the desired redundancy level, when the desired redundancy level is based on assurances against failure of the first storage unit, the processing module of the first storage unit determines the first dispersed storage error encoding function based on the desired redundancy level, where the first dispersed storage error encoding function includes the pillar width number of n, the decode threshold number of k, and where n−k is equal to or greater than n/2.

The method continues at step 177 where the processing module of the first storage unit identifies a first set of memory devices. As a specific example, the first storage unit identifies the first set of memory devices within the first storage unit. The method continues at step 179 where the processing module of the first storage unit stores the first set of encoded data sub-slices. As a specific example, the processing module of the first storage unit stores the first set of encoded data sub-slices in the first set of memory devices.

As another specific example, the processing module of the first storage unit determines to store an encoded data sub-slice of the first set of encoded data sub-slices in a memory device of another storage unit of the storage units, where the other storage unit is a second storage unit or a different one of the storage units. The processing module of the first storage unit selects the other storage unit based on one or more selection criteria from a list of selection criteria. The list of selection criteria includes a query and response with the other storage unit, a pre-established relationship, an ad hoc established relationship, and a determination that the other storage unit has a sufficient amount of available memory. The determining to store the encoded data sub-slice in the other storage unit may be based on one or more determination criteria from a list of determination criteria, where the list of determination criteria includes determining that the first storage unit has less than a desired amount of available memory, determining that the first storage unit has more than a desired number of memory device with an age issue, and determining that the other storage unit has more available storage than the first storage unit.

Having determined to store the encoded data sub-slice of the other storage unit, the processing module of the first storage unit sends encoded data sub-slice to the other storage unit for storage. The processing module of the first storage unit stores remaining encoded data sub-slices of the first set of encoded data sub-slices in a set of memory devices within the first storage unit. As yet another specific example, when n−k is equal to or greater than n/2, the processing module of the first storage unit sends at least n/2 encoded data sub-slices of the first set of encoded data sub-slices to the other storage unit, where the other storage unit is the second storage unit or a different one of the storage units.

The method continues at step 181 where a processing module of a second storage unit of the storage units determines whether to store a second encoded data slice of the set of encoded data slices as the second encoded data slice or as a second set of encoded data sub-slices. When the second encoded data slice is to be stored as the second set of encoded data sub-slices, the processing module of the second storage unit encodes the second encoded data slice in accordance with a second dispersed storage error encoding function to produce the second set of encoded data sub-slices.

The method continues at step 185 where the processing module of the second storage unit identifies a second set of memory devices. For example, the processing module of the second storage unit identifies the second set of memory devices within the second storage unit. The method continues at step 187 where the processing module of the second storage unit stores the second set of encoded data slices. For example, the processing module of the second storage unit stores the second set of encoded data sub-slices in the second set of memory devices.

The method described above in conjunction with a processing module can alternatively be performed by other units of a dispersed storage network or by other devices. In addition, at least one memory section that stores operational instructions that can, when executed by one or more processing modules of one or more computing devices of a dispersed storage network (DSN), cause the one or more computing devices to perform any or all of the method steps described above.

FIG. 12 is another flowchart illustrating another example of storing slices by a DS processing 34 where the DS processing 34 determines which memories of a DS unit 174 or of one or more other DS units to utilize as discussed below. The method begins with step 176 where the DS processing receives a data object to store from the user device, the DS processing unit, the DS managing unit, the DS unit, and/or the storage integrity processing unit. The DS processing may receive one or more of the data object name, a data object size indicator, a slice name, a simple object file, a block file, a command, a priority indicator, a security indicator, a user ID, and a data type with the data object.

The method continues at step 178 where the DS processing determines memory status of the memory of the DS unit and/or the memory of one or more other DS units. Such a determination may be based on one or more of a lookup, a command, a query, and/or a DS managing unit message. For example, the DS processing may determine that memory 5 is unavailable via a query. In an instance, the DS processing determines that the memory status is not fully operational if at least one memory is not available. In another instance, the DS processing determines that the memory status is fully operational when all of the memories are available. The method branches to step 196 when the DS processing determines that the memory status is fully operational. The method continues to step 180 when the DS processing determines that the memory status is not fully operational.

At step 180, the DS processing determines temporary operational parameters which may include one or more of the pillar width n, the read threshold, the encoding algorithm, the slicing method, pre-data manipulation, and post-data manipulation. Such a determination may be based on one or more of which memory is not available, how many memories are not available, a table lookup, a command, the data object size indicator, a memory status, a memory availability indicator, the priority indicator, the security indicator, the user ID, and the data type. For example, the DS processing may determine the pillar width n=6 and the read threshold=4 when the memory status indicates that memories 10-12 are unavailable. In this example, the DS processing subsequently stores the 6 pillars in 6 of the remaining 9 available memories. In another example, the DS processing may determine the pillar width n=12 and the read threshold=8 when the memory status indicates that memory 5 is unavailable. In this example, the DS processing subsequently stores 11 of the 12 pillar slices in 11 of the remaining 11 available memories and temporarily stores the $12^{th}$ pillar slices in one of the memories and/or in another DS unit. In addition, the DS processing may subsequently move the temporarily stored slices to memory 12 when memory 12 is available.

At step 182, the DS processing determines temporary memory (e.g., memory ID) or memories to utilize to store the slices which may include one or more of one memory in the DS unit, a spare memory, an unused memory, two or more memories in the DS unit, and/or memory in another DS unit. Such a determination may be based on one or more of which memory is not available, how many memories are not available, a table lookup, a command, the data object size indicator, a memory status, a memory availability indicator, the priority indicator, the security indicator, the user ID, and the data type. For example, the DS processing determines to utilize temporary memories 1-4 and 6-12 to store 11 of the 12 pillar slices (e.g., with 12/8 operational parameters) and memory 1 to store the $12^{th}$ pillar slices when memory 5 is unavailable.

At step 184, the DS processing determines temporary memories locations (e.g., addresses) to utilize in the determined temporary memory to store the slices which may include one or more of an even distribution of pillar locations, all the pillars in sequence starting at one location, a pillar distribution to avoid known memory issues, and a pillar distribution to avoid predicted future memory issues. The location determination may be based on one or more of where last slices were stored, a table lookup, a command, the data object size indicator, a memory status, a memory availability indicator, the priority indicator, the security indicator, the user ID, and the data type.

The method continues at step 186 where the DS processing creates the EC data slices of the data object in accordance with the temporary operational parameters. At step 188, the DS processing writes the slices to the determined temporary memories at the determined temporary memories locations. At step 190, the DS processing saves the slice name, temporary memory ID, temporary memory locations (e.g., starting address), and sizes of the slices in the virtual DSN address to physical location table to facilitate subsequent retrieval of the data object.

The method continues at step 192 where the DS processing determines memory status of the DS unit and/or the memory of one or more other DS units to determine if memory that was unavailable is now available. Such a determination may be based on one or more of a lookup, a command, a query, and/or a DS managing unit message. For example, the DS processing determines that memory 5 is now available via a query. The DS processing determines that the memory status is not fully operational if at least one memory is not available. The DS processing determines that the memory status is fully operational when all of the memories are available. The method branches back step 192 when the DS processing determines that the memory status is not fully operational. The method continues step 194 when the DS processing determines that the memory status is fully operational.

The method continues at step 194 where the DS processing retrieves the slices from the temporary memories at the temporary memories locations. Next, the DS processing recreates the data object in accordance with the temporary operational parameters. The method continues to step 196.

At step 196, the DS processing determines local operational parameters, which may include one or more of the pillar width n, the read threshold, the encoding algorithm, the slicing method, pre-data manipulation, and post-data manipulation. Such a determination may be based on one or more of a table lookup, a command, the data object size indicator, a memory status, a memory availability indicator, the priority indicator, the security indicator, the user ID, and the data type. For example, the DS processing may determine the pillar width n=12 and the read threshold=8 when the table lookup indicates a preference for a 12/8 system (e.g., to utilize the memory configuration of memories 1-12) and the memory status indicates that the memory is fully operational with no recent errors.

At step 198, the DS processing determines the memories (e.g., memory ID) to utilize to store the slices, which may include one or more of one memory in the DS unit, two or more memories in the DS unit, and memory in another DS unit. Such a determination may be based on one or more of a table lookup, a command, the data object size indicator, a memory status, a memory availability indicator, the priority indicator, the security indicator, the user ID, and the data type.

At step 200, the DS processing determines memories locations (e.g., addresses) to utilize in the determined memories to store the slices which may include one or more of, but not limited to an even distribution of pillar locations, all the pillars in sequence starting at one location, a pillar distribution to avoid known memory issues, and a pillar distribution to avoid predicted future memory issues. The location determination may be based on one or more of where last slices were stored, a table lookup, a command, the data object size indicator, a memory status, a memory availability indicator, the priority indicator, the security indicator, the user ID, and the data type.

At step 202, the DS processing creates the EC data slices of the data object in accordance with the local operational parameters. At step 204, the DS processing writes the slices to the determined memories at the determined memories locations. At step 206, the DS processing saves the slice name, memory ID, memories locations (e.g., starting address), and sizes of the slices in the virtual DSN address to physical location table to facilitate subsequent retrieval of the data object.

FIG. 13 is a schematic block diagram of another embodiment of a computing system that includes a plurality of DS units 1-7 where at least one of the plurality of DS units 1-7 includes a DS processing 34 to create slices to be stored in one or more of the plurality of DS units 1-7. The DS units 1-7 may be installed at one or more sites. For example, DS unit 1 208 may be at site 1, DS units 2-4 may be at site 2, and DS units 5-7 may be at site 3.

As illustrated, the DS unit 1 208 at site 1 may include the DS processing 34 and a plurality of memories 1-12. The DS processing 34 may be implemented with the computing core 26. The memories 1-12 may be one or more of a magnetic hard disk, NAND flash, read only memory, optical disk, and any other type of read-only or read/write memory. The memories 1-12 may be implemented as part of or outside of the DS unit 208. For example, memories 1-4 may be implemented in the DS unit 208 and memories 5-12 may be implemented in a remote server (e.g., a different DS unit operably coupled to the DS unit 208 via the network 24). In another example, memories 1-8 are implemented with the magnetic hard disk technology and memories 9-12 are implemented with the NAND flash technology.

As illustrated, the DS units 2-7 each include memories 1-4. In this instance, DS units 2-7 do not include the DS processing 34. The DS processing 34 of DS unit 208 is operably coupled to DS units 2-7 to facilitate storing and retrieving of data to and from the DS unit 2-7 memories 1-4. The DS processing 34 may be operably coupled to the computing system via the network to four. The DS processing 34 may receive a store command, metadata, and a data object to store. The data object may include a simple object file, a block file, and/or EC data slices. In an example, the DS processing 34 stores the data object in one or more of the memories 1-12 substantially as received (e.g., a slice is stored as a slice, a block file is stored as a block file, etc.). In another example, the DS processing 34 creates EC data slices of the data object and stores the slices in one or more of the memories 1-12 as slices. Note that a DS processing unit may determine to utilize only memories 1-12 of the DS unit 208 when the capabilities of memories 1-12 substantially meet the requirements. In another example, the DS processing unit may determine to utilize some combination of the memories 1-12 of the DS unit 208 and memory of at least one other DS unit 2-7 when the capabilities of memories 1-12 alone do not substantially meet the requirements.

In an example, the DS processing 34 of DS unit 208 determines where (e.g., which address of one or more of the memories) to store the received data object as EC data slices. Such a determination may be based on one or more of the metadata, a command (e.g., from the DS processing unit indicating which memory type to use), a type of data indicator, a local virtual DSN address to physical location table lookup, a priority indicator, a security indicator, available memory, memory performance data, memory status, memory cost data, and any other parameter to facilitate desired levels of efficiency and performance. For example, the DS processing 34 may choose memories 1-12 (e.g., magnetic hard disk drives) to store the EC data slices since the performance and efficiency is good enough for the requirements (e.g., availability, cost, response time). In another example, the DS processing 34 distributes the slices to memories 1-10 when memories 11 and 12 are not available. In another example, the DS processing 34 distributes the slices at various addresses across one memory. In another example, the DS processing 34 distributes a read threshold k=8 of the slices across memories 1-8 (to enable fast retrieval) and the other 4 (n–k) slices to DS units 2-7. In yet another example, the DS processing 34 distributes the slices across the DS unit memories and at least one other DS unit 2-7.

The DS processing 34 creates and maintains the local virtual DSN address to physical memory table. The DS processing module 34 determines where previously stored EC data slices are located based on the local virtual DSN address to physical memory table upon receiving a retrieve command via the network. Note that the DS unit 208 access may be via a WebDAV sequence, e.g., via an IP address such as http://21.8.43/vault1 to facilitate easy DS unit 208 access.

The plurality of DS units may include one, two, three, or more DS units at any point in time. For example, the system may start with DS unit 208 at site 1 and may add DS unit 2 at site 2 at a subsequent time. The DS processing 34 may detect that DS unit 2 was added and may move a portion of stored data from the memories of DS unit 208 to DS unit 2 in response. In another example, DS unit 5 may be added at a still further subsequent time. The DS processing before may detect that DS unit 5 was added and may move a portion of stored data from DS unit 208 and DS unit 2 to DS unit 5 in response.

In another example, the DS processing 34 may move all 12 pillars of slices from the memories 1-12 of DS unit 208 to memories 1-4 of DS units 2-4 when the DS processing 34 detects that the site 2 DS units 2-4 are available. Still later, the DS processing 34 may redistribute all 12 pillars of slices from the memories 1-4 of DS units 2-4 to memories 1-4 of DS units 2-7 when the DS processing detects that the site 3 DS units 5-7 are also available. The method to determine added DS units and to move a portion of the data will be discussed in greater detail with reference to FIG. 14.

FIG. 14 is a flowchart illustrating an example of distributing slices. The method begins at step 210 where a DS processing determines if the DS unit storage set configuration has changed. A configuration change may include the addition or subtraction of DS units assigned as pillars of common storage sets. The DS units may comprise pillars at one or more sites. Such a determination may be based on one or more of a command, a new configuration message from the DS managing unit, a lookup, and a query. The method repeats step 210 when the DS processing determines that the DS unit storage set configuration has not changed. The method branches to step 212 when the DS processing determines that the DS unit storage set configuration has changed.

At step 212, the DS processing determines the new storage set and new operational parameters. The new storage set determination may be based on one or more of the current storage set configuration, the location of a new DS unit, DS unit capabilities, predetermined storage set configuration goals, a command, a new configuration message from the DS managing unit, a lookup, and a query. For example, the DS processing determines the new storage set to replace a current storage set where the new storage set will utilize more sites to improve reliability when the predetermined storage set configuration goals indicate more reliability and the storage set change enables at least one new site.

At step 212, the determination of the operational parameters may be based on one or more of the new storage set, the current operational parameters, the current storage set configuration, the location of a new DS unit, DS unit capabilities, predetermined storage set configuration goals, a command, a new configuration message from the DS managing unit, a lookup, and a query. For example, the DS processing determines the new operational parameters to replace the current operational parameters where the new operational parameters will utilize more pillars to improve reliability when the predetermined storage set configuration goals indicate more reliability and the storage set change enables at least one new pillar.

The method continues at step 214 where the DS processing determines what portion of the slices to move based on one or more of, but not limited to the new storage set, the new operational parameters, the current operational parameters, the current storage set configuration, a current memory utilization indicator, an amount of data stored indicator, a current storage set performance indicator, a new storage set capacity indicator, the location of a new DS unit, DS unit capabilities, predetermined storage set configuration goals, a command, a new configuration message from the DS managing unit, a lookup, and a query. For example, the DS processing determines the portion of the slices to move to be 25% when the current memory utilization indicator has not reached a high threshold and the new storage set capacity indicator is at least a threshold greater than the amount of data to be moved.

At step 216, the DS processing retrieves slices from the current storage set in accordance with the current operational parameters based on a lookup in a local DSN address to physical location table. The slice retrieval may include reading slices from the DS unit memories and/or sending a retrieve slice command to one or more DS units. The DS processing reads the slices from memory and/or receives the slices in message(s) from other DS unit(s).

At step 218, the DS processing recreates data segments and data objects by de-slicing and decoding the read and/or received slices in accordance with the current operational parameters. At step 220, the DS processing creates slices of the data objects in accordance with the new operational parameters. At step 222, the DS processing writes slices to the DS unit memory (for pillars of the DS unit) and/or sends slices with a store command for storage of slices in other DS unit(s) where the DS unit and the other DS unit(s) comprise the new storage set. The DS processing saves the storage locations of the slices in the local virtual DSN address to physical location table to be utilized in subsequent data object retrieval.

FIG. 15A is a schematic block diagram of another embodiment of a computing system. As illustrated, the system includes a DS managing unit 18 and a plurality of DS units 1-4. The DS units 1-4 may be allocated to one or more DS unit storage sets 1-2 (e.g., a set of DS units where the pillars resulting from encoding and slicing of data segments of a user vault are stored). For example, DS units 1-3 comprise storage set 1 and DS units 2-4 comprise storage set 2.

In an example of operation, the DS managing unit 18 determines an amount of memory allocated to the storage set where the allocation is the amount of available memory the storage set may utilize. Such a determination may be based on one or more of a user vault lookup, a predetermination, the number of system users, the estimated memory use per user, the actual memory use per user, the memory capacity of DS units, the current amount of memory utilization, the amount of unused capacity, a command, an adaptive algorithm, memory status, an error message, and an external input. For example, the DS managing unit 18 determines the amount of memory allocated to the storage set to be 100 terabytes when the amount of unused capacity is above a first threshold and the estimated memory use per user is below a second threshold.

In another example, the DS managing unit 18 determines the amount of memory allocated to the vault(s) that utilize the storage set where the allocation is the amount of available memory the vault may utilize. Such a determination may be based on one or more of a subscription indicator, a user vault lookup, a predetermination, the number of system users, the estimated memory use per user, the actual memory use per user, the memory capacity of DS units, the current amount of memory utilization, the amount of unused capacity, a command, an adaptive algorithm, memory status, an error message, and an external input. For example, the DS managing unit determines the amount of memory allocated to vault 1 to be 30 terabytes when the amount of unused capacity is above a first threshold and the estimated memory use per user is below a second threshold.

The DS managing unit 18 sends a memory allocation information message to the DS units 1-4 of the storage set that contains memory allocation information. The memory allocation information may include one or more of, but not limited to the amount of memory allocated to the storage set, vault IDs that may utilize the storage set, other DS unit IDs of the storage set, and/or storage set operational parameters (e.g., pillar width n). The DS unit saves the memory allocation information including the amount of memory allocated to all of the storage set(s) that include the DS unit. For example, DS unit 1 saves the 100 terabyte allocation to storage set 1, DS units 2 and 3 saves the 100 terabyte allocation to storage set 1 and a 100 terabyte allocation to storage set 2, and DS unit 4 saves the 100 terabyte allocation to storage set 2.

In an instance, DS unit 1 determines when to analyze the memory utilization to produce utilization information 224 that the DS unit 1 sends to the DS managing unit. The utilization information 224-230 may include one or more of vault utilization of memory (e.g., how much is actually stored) per storage set, total memory utilization of all vaults per storage set, total memory used, and/or free memory space. The DS units 1-4 determine when to analyze the memory utilization based on one or more of a time duration since the last analysis, a storage sequence, a time schedule, a command, a message from the DS managing unit, and a received query. For example, DS unit 2 determines to analyze the memory utilization immediately when receiving a store slice command. In another example, the DS unit 3 determines to analyze the memory utilization once every day at 3 AM when the time schedule indicates a daily analysis at 3 AM.

The DS units 1-4 determine the memory utilization and produces utilization information 224-230. For example, the DS unit 1 determines that vault 1 is utilizing 26 terabytes of storage set 1, vault 2 is utilizing 20 terabytes of storage set 1, and storage set 1 has 54 terabytes of free space. Note that the memory utilization may be expressed as total vault utilization (e.g., based on DS unit specific utilization and the pillar width of the vault) and/or DS unit specific utilization. For example, the vault 1 DS unit 1 utilization may be 8.66 terabytes and the vault 1 pillar width=3 such that the total vault 1 utilization is 3×8.66 terabytes=26 terabytes. In another memory utilization example, the DS unit 2 determines that vault 1 is utilizing 26 terabytes of storage set 1, vault 2 is utilizing 20 terabytes of storage set 1, storage set 1 has 54 terabytes of free space, vault 1 is utilizing 42 terabytes of storage set 2, and storage set 2 has 58 terabytes of free space. In another memory utilization example, the DS unit 4 determines that vault 1 is utilizing 42 terabytes of storage set 2 and storage set 2 has 58 terabytes of free space.

The DS units 1-4 send the memory utilization information 224-230 to one or more of the DS managing unit, the DS processing unit, the user device, and the storage integrity processing unit when the DS unit 1-4 determines the memory utilization information 224-230. The DS managing unit 18 receives the memory utilization information 224-230 from the DS units 1-4 and aggregates the information. The DS managing unit on it determines the vault utilization and unused capacity and takes action if either or both do not compare favorably to thresholds. The method to process the received memory utilization information 224-230 by the DS managing unit is discussed in greater detail with reference to FIG. 16.

Note that a simple file object vault may not be pre-defined such that writing data increases memory utilization and deleting data lowers the memory utilization. Further note that in a block vault may be pre-defined (e.g., pre-allocated) such that writing data does not increase memory utilization and deleting data does not lower the memory utilization.

FIG. 15B is a schematic block diagram of another embodiment of a computing system that includes the dispersed storage (DS) managing unit 18 of FIG. 15A, DS units 1-4 of FIG. 15A, and the DS processing unit 16 of FIG. 1. The DS units may be organized into two or more storage sets. For example, a storage set 1 (e.g., a first set of storage units) includes DS units 1-3 and a storage set 2 (e.g., a second set of storage units) includes DS units 2-4. Hereafter, a DS unit may be interchangeably referred to as a storage unit. The first and second sets of storage units of a plurality of storage units support a first logical storage vault, where the first and second sets of storage units includes at least one common storage unit (e.g., DS units 2 and 3). For example, the first and second sets storage units support a vault 1 while the first set of storage units supports a vault 2.

In an example of operation, the DS managing unit 18 obtains utilization information regarding the plurality of storage units of the DSN. The utilization information of a storage unit of the plurality of storage units includes a listing of logical storage vaults supported by the storage unit and storage capacity consumed for each logical storage vault listed in the listing of logical storage vaults. The utilization information and may further include one or more of available storage capacity of the storage unit and storage capacity trend data. The first logical storage vault stores a plurality of encoded data objects. An encoded data object of the plurality of encoded data objects consists of a data object being dispersed storage error encoded into a plurality of sets of encoded data slices. For example, the DS processing unit 16 dispersed storage error encodes the data object to produce the plurality of sets of encoded data slices for storage in at least one storage set associated with the first logical storage vault.

The DS managing unit 18 obtains utilization information by one of querying the plurality of storage units for the utilization information, receiving the utilization information from the plurality of storage units, or retrieving the utilization information. As a specific example of the obtaining of the utilization information, the DS managing unit 18 receives the utilization information from the DS units 1-4 indicating that a total of the 120 TB of encoded data objects is stored in the storage set 1 for the first logical storage vault, a total of another 90 TB of encoded data objects is stored in the storage set 2 for the first logical storage vault, and a total of 60 TB of encoded data objects is stored in the storage set 1. As another specific example of the obtaining of the utilization information, the DS managing unit 18 receives further utilization information indicating that the DS unit 1 is storing 60 TB of the encoded data objects and DS unit 4 is storing 30 TB of the encoded data objects, where the DS unit 1 is storing 40 TB of the encoded data objects associated with the first logical storage vault and the DS unit 4 is storing 30 TB of encoded data objects associated with the first logical storage vault.

Having obtained the utilization information, the DS managing unit 18 detects a utilization imbalance between a first storage unit of the first set of storage units and a second storage unit of the second set of storage units based on the utilization information, where the first and second storage units are not the common storage unit. As a specific example, the DS managing unit 18 detects a utilization imbalance between DS unit 1 and DS unit 4 when the utilization information indicates that DS unit 1 is storing 60 TB of the encoded data objects and DS unit 4 is storing 30 TB of the encoded data objects.

Having detected the utilization imbalance, at least one of the DS managing unit 18 and the DS processing unit 16 executes a data storage function regarding the first logical storage vault based on the utilization imbalance. As a specific example of executing the data storage function, the DS processing unit 16 receives a write request as the data storage function, selects the first set of storage units or the second set of storage units based on the utilization imbalance for storing a first data object associated with the write request to produce a selected set of storage units (e.g., the storage set 2), and facilitates storage of the first data object in the selected set of storage units. In an instance of facilitating storage of the first data object, the DS processing unit 16 dispersed storage error encodes the first data object to produce a first plurality of sets of encoded data slices and sends write commands to the storage units of the selected set of storage units regarding storage of the first plurality of sets of encoded data slices.

As another specific example of executing the data storage function, the DS processing unit 16 determines that utilization of the first storage unit has reached a utilization threshold of the first storage unit, determines that utilization of the second storage unit is below a utilization threshold of the second storage unit, identifies encoded data slices of selected sets of encoded data slices of the plurality of sets of encoded data slices to migrate stored by the first storage unit, and migrates the encoded data slices of selected sets of encoded data slices from the first storage unit to the second storage unit. For example, the DS processing unit 16 identifies 15 TB of encoded data slices stored in the DS unit 1 for migration to the DS unit 4, where the 15 TB of encoded data slices associated with the first logical storage vault. In an instance, DS processing unit 16 retrieves the 15 TB of encoded data slices from the DS unit 1 and sends the 15 TB of encoded data slices to the DS unit 4 for storage. As such, the imbalance is cured as each of the DS unit 1 and 4 store 45 TB of encoded data objects after the migration.

Having executed the data storage function, at least one of the DS processing unit 16 and the DS managing unit 18 updates storage location information of the encoded data slices of selected sets of encoded data slices as currently being stored by the second storage unit. For example, the DS processing unit 16 updates the storage location information to indicate that the 15 TB of encoded data slices is associated with the DS unit 4 and is associated with the DS unit 1. As such, performance of retrieval of the data object may be enhanced by retrieving encoded data slices from the storage set 2.

FIG. 16A is a flowchart illustrating an example of determining memory utilization. The method begins with step 232 where a DS managing unit receives memory utilization information from a DS unit. At step 234, the DS managing unit aggregates the memory utilization information per vault to produce vault utilization. For example, the DS managing unit adds the received memory utilization information from a DS unit 3 that vault 1 is utilizing 26 terabytes of storage set 1 to the received memory utilization information from the DS unit 3 that vault 1 is utilizing 42 terabytes of storage set 2 for a total of 68 terabytes.

The method continues with step 236 where the DS managing unit determines storage set unused capacity based on the received memory utilization information. For example, storage set 1 has 54 terabytes of unused capacity and storage set 2 has 58 terabytes of unused capacity. At step 238, the DS managing unit determines if vault utilization compares favorably to a utilization threshold. For example, the DS managing unit determines that the vault utilization compares favorably to the utilization threshold when the vault 1 utilization is 68 terabytes and the utilization threshold is 150 terabytes. Note that the DS managing unit determines the utilization threshold based on one or more of, but not limited to a predetermined value, a user vault lookup, a predetermination, a command, an input to the DS managing unit, and/or a dynamic value. The method branches step 242 when the DS managing unit determines that the vault utilization compares favorably to the utilization threshold. The method continues to the step 240 when the DS managing unit determines that the vault utilization does not compare favorably to the utilization threshold. At step 240, the DS managing unit sends an alert message (e.g., to the user device, DS unit, DS processing unit, and/or a manager station) containing the vault ID of the vault with the unfavorable vault utilization. Alternatively, or in addition to, the DS managing unit may perform one or more of modifying the utilization threshold, modifying the amount of memory allocated to the storage set of the vault, delete a portion of the slices stored in the vault, and move a portion of the slices stored in the vault to another storage set. Note that the DS managing unit may repeat the steps above for each vault.

The method continues at step 242 where the DS managing unit determines if unused capacity compares favorably to a capacity threshold. For example, the DS managing unit determines that the unused capacity compares favorably to the capacity threshold when the storage set 1 free space is 54 terabytes and the capacity threshold is 10 terabytes. Note that the DS managing unit determines the capacity threshold based on one or more of a historic memory usage factor, a predetermined value, a user vault lookup, a predetermination, a command, an input to the DS managing unit, and a dynamic value. The method repeats back to step 232 when the DS managing unit determines that the unused capacity compares favorably to the capacity threshold. The method continues to step 244 when the DS managing unit determines that the unused capacity does not compare favorably to the capacity threshold. At step 244, the DS managing unit allocates more memory to the storage set. Alternatively, or in addition to, the DS managing unit performs one or more of sending an alert message (e.g., to the user device, DS unit, DS processing unit, and/or a manager station) containing the storage set ID with the unfavorable unused capacity, modifying the capacity threshold, deleting a portion of the slices stored in the storage set, and/or moving a portion of the slices stored in the storage set to another storage set. The method branches back to step 232.

FIG. 16B is a flowchart illustrating another example of determining memory utilization. In particular, a method is presented for use in conjunction with one or more functions and features described in conjunction with FIGS. 1-5, 15A-16A and also FIG. 16B. The method includes step 250 where a processing module of a dispersed storage network (DSN) obtains utilization information regarding a plurality of storage units of the DSN, where first and second sets of storage units of the plurality of storage units support a first logical storage vault. The first and second sets of storage units includes a common storage unit. The utilization information of a storage unit of the plurality of storage units includes a listing of logical storage vaults supported by the storage unit and storage capacity consumed for each logical storage vault listed in the listing of logical storage vaults. The first logical storage vault stores a plurality of encoded data objects, where an encoded data object of the plurality of encoded data objects consists of a data object being dispersed storage error encoded into a plurality of sets of encoded data slices. The processing module obtains the utilization information by one of querying the plurality of storage units for the utilization information, receiving the utilization information from the plurality of storage units, or retrieving the utilization information.

The method continues at step 252 where the processing module detects a utilization imbalance between a first storage unit of the first set of storage units and a second storage unit of the second set of storage units based on the utilization information, where the first and second storage units are not the common storage unit. The method continues at step 254 where the processing module executes a data storage function regarding the first logical storage vault based on the utilization imbalance.

As a specific example of the executing the data storage function, the processing module receives a write request as the data storage function, selects the first set of storage units or the second set of storage units based on the utilization imbalance for storing a first data object associated with the write request to produce a selected set of storage units, and facilitates storage of the first data object in the selected set of storage units. The facilitating storage of the first data object includes dispersed storage error encoding the first data object to produce a first plurality of sets of encoded data slices and sending write commands to the storage units of the selected set of storage units regarding storage of the first plurality of sets of encoded data slices.

As another specific example of the executing the data storage function, the processing module determines that utilization of the first storage unit has reached a utilization threshold of the first storage unit, determines that utilization of the second storage unit is below a utilization threshold of the second storage unit, identifies encoded data slices of selected sets of encoded data slices of the plurality of sets of encoded data slices to migrate stored by the first storage unit, and migrates the encoded data slices of selected sets of encoded data slices from the first storage unit to the second storage unit.

The method continues at step 256 where the processing module updates storage location information of the encoded data slices of selected sets of encoded data slices as currently being stored by the second storage unit. For example, the processing module associates slice names of the selected sets of encoded data slices with the second storage unit and disassociates the slice names of the selected sets of encoded data slices with the first storage unit.

The method described above in conjunction with a processing module can alternatively be performed by other units of a dispersed storage network or by other devices. In addition, at least one memory section that stores operational instructions that can, when executed by one or more processing modules of one or more computing devices of a dispersed storage network (DSN), cause the one or more computing devices to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by a storage unit of a dispersed storage network (DSN), the method comprises:

detecting a likelihood of the storage unit having a missing encoded data slice based on local physical-to-DSN address mapping information by interpreting the local physical-to-DSN address mapping information to determine that a sub-range of DSN addresses is not affiliated with a particular memory device of the storage unit; and when the likelihood of having the missing encoded data slice exists:

sending a query regarding the missing encoded data slice to another storage unit of the DSN;

receiving a response to the query from the other storage unit; and when the response includes identity of a related encoded data slice of a set of encoded data slices, commencing execution of a rebuilding function to generate a new encoded data slice to replace the missing encoded data slice, wherein a data segment of a data object is encoded into the set of encoded data slices, wherein a threshold number of encoded data slices of the set of encoded data slices is required to recover the data segment, wherein the threshold number is less than a number of encoded data slices in the set of encoded data slices, wherein the other storage unit stores the related encoded data slice, wherein the storage unit has been assigned to store a second encoded data slice of the set of encoded data slices, and wherein the second encoded data slice corresponds to the missing encoded data slice.

2. The method of claim 1, wherein the detecting the likelihood of having a missing encoded data slice further comprises:

interpreting the local physical-to-DSN address mapping information to determine that the sub-range of DSN addresses has a disproportionate amount of encoded data slices having DSN addresses in the sub-range of DSN addresses to other sub-ranges of DSN addresses.

3. The method of claim 1 further comprises:

sending the query to the other storage unit, wherein the query includes a request for the related encoded data slice; and receiving, as the response, the related encoded data slice from the other storage unit.

4. The method of claim 3 further comprises:
sending the query to storage units of the DSN, wherein the query includes a request for other related encoded data slices of the set of encoded data slices;
receiving, as a set of responses, the other related encoded data slices;
when the related encoded data slice and the other related encoded data slices amounts to the threshold number, decoding the related encoded data slice and the other related encoded data slices to recapture the data segment; and
encoding the data segment to create the new encoded data slice.

5. The method of claim 1, wherein the commencing the execution of the rebuilding function comprises:
sending requests to storage units of the DSN regarding other related encoded data slices of the set of encoded data slices;
receiving, as a set of responses, the other related encoded data slices;
when the related encoded data slice and the other related encoded data slices amounts to the threshold number, decoding the related encoded data slice and the other related encoded data slices to recapture the data segment; and
encoding the data segment to create the new encoded data slice.

6. A storage unit of a dispersed storage network (DSN), the storage unit comprises:
a memory;
an interface; and
a processing module operably coupled to the memory and the interface, wherein the processing module is operable to:
detect a likelihood of the storage unit having a missing encoded data slice based on local physical to DSN address mapping information by interpreting the local physical-to-DSN address mapping information to determine that a sub-range of DSN addresses is not affiliated with a particular memory device of the storage unit; and
when the likelihood of having the missing encoded data slice exists:
send, via the interface, a query regarding the missing encoded data slice to another storage unit of the DSN;
receive, via the interface, a response to the query from the other storage unit; and
when the response includes identity of a related encoded data slice of a set of encoded data slices, commence execution of a rebuilding function to generate a new encoded data slice to replace the missing encoded data slice, wherein a data segment of a data object is encoded into the set of encoded data slices, wherein a threshold number of encoded data slices of the set of encoded data slices is required to recover the data segment, wherein the threshold number is less than a number of encoded data slices in the set of encoded data slices, wherein the other storage unit stores the related encoded data slice, wherein the storage unit has been assigned to store a second encoded data slice of the set of encoded data slices, and wherein the second encoded data slice corresponds to the missing encoded data slice.

7. The storage unit of claim 6, wherein the processing module further functions to detect the likelihood of having a missing encoded data slice by:
interpreting the local physical-to-DSN address mapping information to determine that a sub-range of DSN addresses has a disproportionate amount of encoded data slices having DSN addresses in the sub-range of DSN addresses to other sub-ranges of DSN addresses.

8. The storage unit of claim 6 further comprises:
the processing module is further operable to:
send, via the interface, the query to the other storage unit, wherein the query includes a request for the related encoded data slice; and
receive, as the response via the interface, the related encoded data slice from the other storage unit.

9. The storage unit of claim 8 further comprises:
the processing module is further operable to:
send, via the interface, the query to storage units of the DSN, wherein the query includes a request for other related encoded data slices of the set of encoded data slices;
receive, as a set of responses via the interface, the other related encoded data slices;
when the related encoded data slice and the other related encoded data slices amounts to the threshold number, decode the related encoded data slice and the other related encoded data slices to recapture the data segment; and
encode the data segment to create the new encoded data slice.

10. The storage unit of claim 6, wherein the processing module commences the execution of the rebuilding function by:
sending, via the interface, requests to storage units of the DSN regarding other related encoded data slices of the set of encoded data slices;
receiving, as a set of responses via the interface, the other related encoded data slices;
when the related encoded data slice and the other related encoded data slices amounts to the threshold number, decoding the related encoded data slice and the other related encoded data slices to recapture the data segment; and
encoding the data segment to create the new encoded data slice.

* * * * *